(12) United States Patent
Lee et al.

(10) Patent No.: US 9,491,354 B2
(45) Date of Patent: Nov. 8, 2016

(54) MOBILE TERMINAL AND CONTROL METHOD THEREOF

(71) Applicant: LG ELECTRONICS INC., Seoul (KR)

(72) Inventors: Jaehwa Lee, Seoul (KR); Seol Namgung, Seoul (KR); Jieun Lee, Seoul (KR)

(73) Assignee: LG Electronics Inc., Seoul (KR)

(*) Notice: Subject to any disclaimer, the term of this patent is extended or adjusted under 35 U.S.C. 154(b) by 9 days.

(21) Appl. No.: 14/304,325

(22) Filed: Jun. 13, 2014

(65) Prior Publication Data

US 2015/0015763 A1    Jan. 15, 2015

(30) Foreign Application Priority Data

Jul. 12, 2013   (KR) .................. 10-2013-0082377

(51) Int. Cl.
*H04N 5/232* (2006.01)
*H04N 1/00* (2006.01)
*H04N 5/28* (2006.01)
*H04N 1/21* (2006.01)

(52) U.S. Cl.
CPC ...... *H04N 5/23222* (2013.01); *H04N 1/00352* (2013.01); *H04N 1/215* (2013.01); *H04N 5/23293* (2013.01); *H04N 5/28* (2013.01); *H04N 2201/3247* (2013.01)

(58) Field of Classification Search
CPC ............. H04N 1/215; H04N 1/00352; H04N 5/2322; H04N 5/23293; H04N 5/28; H04N 2201/3247
USPC ............ 348/333.01, 333.02, 333.05, 333.12, 348/231.2, 231.3, 231.99
See application file for complete search history.

(56) References Cited

U.S. PATENT DOCUMENTS

| 5,367,332 A * | 11/1994 | Kerns ................. H04N 1/0044 348/231.1 |
| 6,970,192 B2 * | 11/2005 | Takayama ........... G11B 27/105 348/218.1 |
| 8,341,555 B2 * | 12/2012 | Ayatsuka .......... G06F 17/30274 715/825 |
| 2003/0112357 A1 * | 6/2003 | Anderson ............. H04N 5/772 348/333.05 |
| 2007/0270182 A1 * | 11/2007 | Gulliksson ......... H04N 1/00413 455/556.1 |
| 2008/0012954 A1 * | 1/2008 | Sasaki ............... G06F 17/30274 348/222.1 |
| 2010/0194963 A1 | 8/2010 | Terashima |

FOREIGN PATENT DOCUMENTS

JP    2011-176769 A    9/2011

OTHER PUBLICATIONS

Extended European Search Report issued in Application No. 14175437.4 dated Mar. 13, 2015.

* cited by examiner

*Primary Examiner* — Aung S Moe
*Assistant Examiner* — Chriss Yoder, III
(74) *Attorney, Agent, or Firm* — KED & Associates LLP

(57) ABSTRACT

The present disclosure relates to a mobile terminal capable of displaying an image and a control method thereof. A mobile terminal according to an embodiment of the present disclosure may include an image generation unit configured to capture an image; a display unit configured to display the captured image; and a controller configured to capture a first image at a first point in time at which an image generation control command is received and capture a second image at a second point in time which is a point in time subsequent to the first point in time at which the image generation control command is received, and automatically capture and store at least one image between the first and the second points in time in a preset specific condition.

23 Claims, 28 Drawing Sheets

(a)

(b)

(a)

(b)

(a)

(b)

(a)

(b)

(a)

(b)

MOBILE TERMINAL AND CONTROL METHOD THEREOF

CROSS-REFERENCE TO RELATED APPLICATION

This application claims the benefit of priority of Korean Patent Application No. 10-2013-0082377, filed on Jul. 12, 2013, which is herein expressly incorporated by reference in their entireties.

BACKGROUND

1. Field

The present disclosure relates to a mobile terminal, and more particularly, to a mobile terminal capable of displaying an image and a control method thereof.

2. Background

Terminals can be classified into two types, such as a mobile or portable terminal and a stationary terminal based on its mobility. Furthermore, the mobile terminal can be further classified into two types, such as a handheld terminal and a vehicle mount terminal based on whether or not it can be directly carried by a user.

As it becomes multifunctional, for example, such a terminal is allowed to capture still images or moving images, play music or video files, play games, receive broadcast and the like, so as to be implemented as an integrated multimedia player. Moreover, the improvement of structural or software elements of the terminal may be taken into consideration to support and enhance the functions of the terminal.

Owing to the enhancement, an image that has captured various objects such as humans, things or the like may be generated through a camera of the terminal. However, when the image is generated only in case where the user directly touches a capture button of the terminal camera, it may cause a problem of missing his or her desired scene.

Furthermore, there has been some inconvenience in viewing images that have been captured for the same object or images that have been captured within a predetermined period of time in an all-at-once or successive manner.

SUMMARY OF THE INVENTION

An objective of the present disclosure is to provide a mobile terminal and control method thereof capable of displaying a plurality of captured images in a successively linked manner.

A mobile terminal according to an embodiment of the present disclosure may include an image generation unit configured to capture an image; a display unit configured to display the captured image; and a controller configured to capture a first image at a first point in time at which an image generation control command is received and capture a second image at a second point in time which is a point in time subsequent to the first point in time at which the image generation control command is received, and automatically capture and store at least one image between the first and the second points in time in a preset specific condition.

According to an embodiment, the preset specific condition may be set to at least one of a case where the first and the second points in time are within a previously set predetermined time, a case where the first and the second image are captured within a previously set predetermined distance, and a case where the first and the second image contain the same object.

According to an embodiment, the controller may automatically capture and store at least one image for a predetermined period of time prior to and subsequent to the first point in time, and automatically capture and store at least one image for a predetermined period of time prior to and subsequent to the second point in time.

According to an embodiment, the controller may display the first and the second image to be adjacent to each other, and display a link object to connect the plurality of adjacent images between the plurality of adjacent images.

According to an embodiment, the controller may display at least one image automatically captured between the first and the second points in time to be adjacent to the link object when the link object is selected.

According to an embodiment, the controller may display an image selected from the first and the second image and at least one image automatically captured between the first and the second points in time and at least one image captured subsequent to the selected image in a successively linked manner according to the captured time sequence.

According to an embodiment, the controller may display the first and the second image and at least one image automatically captured between the first and the second points in time to be adjacent to one another.

According to an embodiment, the controller may select and delete at least one image among the displayed adjacent images or add at least one new image to the displayed adjacent image to edit the displayed adjacent image.

According to an embodiment, the controller may display an image selected from the displayed adjacent images and at least one image captured subsequent to the selected image in a successively linked manner according to the captured time sequence.

A control method of a mobile terminal according to an embodiment of the present disclosure may include (a) capturing a first image at a first point in time at which an image generation control command is received; (b) automatically capturing and storing at least one image in a preset specific condition; and (c) capturing a second image at a second point in time which is a point in time subsequent to the first point in time at which the image generation control command is received.

According to an embodiment, the preset specific condition may include at least one of a case where the first and the second points in time are within a previously set predetermined time, a case where the first and the second image are captured within a previously set predetermined distance, and a case where the first and the second image contain the same object in the step (b).

According to an embodiment, the step (a) may include automatically capturing and storing at least one image for a predetermined period of time prior to and subsequent to the first point in time, and the step (c) may include automatically capturing and storing at least one image for a predetermined period of time prior to and subsequent to the second point in time.

According to an embodiment, the method may further include (d1) displaying the first and the second image to be adjacent to each other, and displaying a link object to connect the plurality of adjacent images between the plurality of adjacent images.

According to an embodiment, the step (d1) may include displaying at least one image automatically captured between the first and the second points in time to be adjacent to the link object when the link object is selected.

According to an embodiment, the step (d1) may include displaying an image selected from the first and the second image and at least one image automatically captured between the first and the second points in time and at least one image captured subsequent to the selected image in a successively linked manner according to the captured time sequence.

According to an embodiment, the method may further include (d2) displaying the first and the second image and at least one image automatically captured between the first and the second points in time to be adjacent to one another.

According to an embodiment, the step (d2) may include selecting and deleting at least one image among the displayed adjacent images or adding at least one new image to the displayed adjacent image to edit the displayed adjacent image:

According to an embodiment, the step (d2) may include displaying an image selected from the displayed adjacent images and at least one image captured subsequent to the selected image in a successively linked manner according to the captured time sequence.

BRIEF DESCRIPTION OF THE DRAWINGS

The embodiments will be described in detail with reference to the following drawings in which like reference numerals refer to like elements wherein.

DETAILED DESCRIPTION

Figure 1:
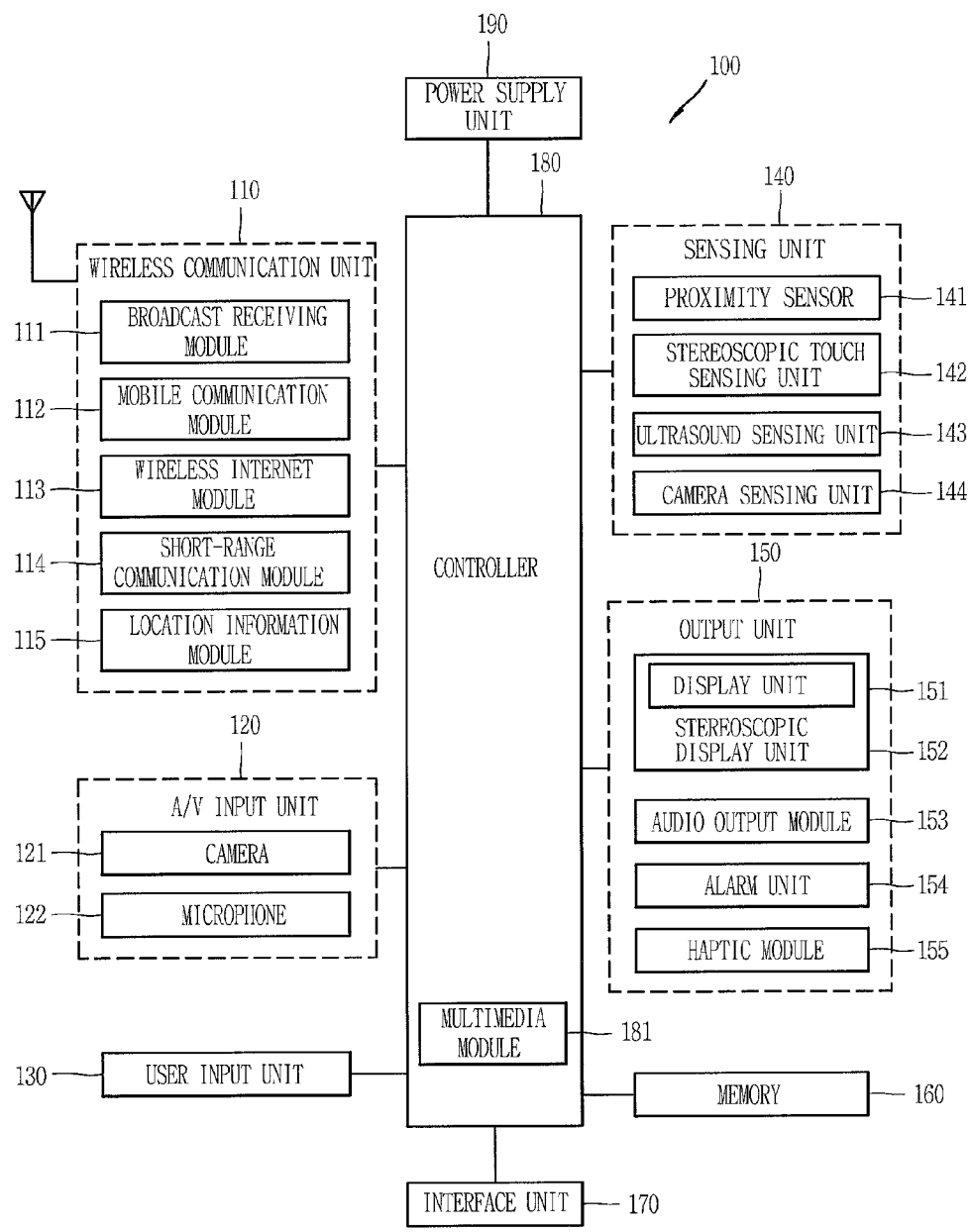
FIG. 1 is a block diagram illustrating a mobile terminal according to an embodiment disclosed in the present disclosure.

Hereinafter, preferred embodiments of the present invention will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present invention, moreover, the detailed description will be omitted when a specific description for publicly known technologies to which the invention pertains is judged to obscure the gist of the present invention.

A mobile terminal disclosed herein may include a portable phone, a smart phone, a laptop computer, a digital broadcast mobile device, a personal digital assistant (PDA), a mobile multimedia player (PMP), a navigation, a slate PC, a tablet PC, an ultrabook, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile terminal 100 according to an embodiment disclosed in the present disclosure.

The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements.

Hereinafter, the foregoing constituent elements will be described in sequence.

The wireless communication unit 110 may include one or more modules allowing radio communication between the mobile terminal 100 and a wireless communication system, or allowing radio communication between the mobile terminal 100 and a network in which the mobile terminal 100 is located. For example, the wireless communication unit 110 may include at least one of a broadcast receiving module 111, a mobile communication module 112, a wireless Internet module 113, a short-range communication module 114, a location information module 115, and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. Of course, the broadcast receiving module 111 may be configured to be suitable for every broadcast system transmitting broadcast signals as well as the digital broadcasting systems.

Broadcast signals and/or broadcast associated information received via the broadcast receiving module 111 may be stored in a memory 160.

The mobile communication module 112 transmits and receives wireless signals to and from at least one a base station, an external terminal and a server on a mobile communication network. Here, the wireless signals may include audio call signals, video call signals, or various formats of data according to the transmission and reception of text/multimedia messages.

The mobile communication module 112 may be configured to implement a video communication mode and a voice communication mode. The video communication mode refers to a configuration in which communication is made while viewing the image of the counterpart, and the voice communication mode refers to a configuration in which communication is made without viewing the image of the counterpart. The mobile communication module 112 may be configured to transmit or receive at least one of audio or video data to implement the video communication mode and voice communication mode.

The wireless Internet module 113 refers to a module for supporting wireless Internet access, and may be built-in or externally installed on the mobile terminal 100. Here, it may be used a wireless Internet access technique including WLAN (Wireless LAN), Wi-Fi (Wireless Fidelity) Direct, DLNA (Digital Living Network Alliance), Wibro (Wireless Broadband), Wimax (World Interoperability for Microwave Access), HSDPA (High Speed Downlink Packet Access), and the like.

The short-range communication module 114 refers to a module for supporting a short-range communication. Here, it may be used a short-range communication technology including Bluetooth™, Radio Frequency IDentification (RFID), Infrared Data Association (IrDA), Ultra WideBand (UWB), ZigBee, Near Field Communication (NFC) and the like.

The location information module 115 is a module for checking or acquiring the location of the mobile terminal, and there is a Global Positioning Module (GPS) module or Wireless Fidelity (WiFi) as a representative example.

Referring to FIG. 1, the A/V (audio/video) input unit 120 receives an audio or video signal, and the A/V (audio/video) input unit 120 may include a camera 121 and a microphone 122. The camera 121 processes image frames, such as still or moving images, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Furthermore, the user's location information or the like may be produced from image frames acquired from the camera 121. Two or more cameras 121 may be provided according to the use environment.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed configuration of the mobile terminal 100, a location of the mobile terminal 100, a presence or absence of user contact with the mobile terminal 100, an orientation of the mobile terminal 100, an acceleration/deceleration of the mobile terminal 100, and the like, so as to generate a sensing signal for controlling the operation of the mobile terminal 100. For example, when the mobile terminal 100 is a slide phone type, the sensing unit 140 may sense whether a sliding portion of the mobile terminal is open or closed. Other examples include sensing functions, such as the sensing unit 140 sensing the presence or absence of power provided by the power supply unit 190, the presence or absence of a coupling between the interface unit 170 and an external device.

The output unit 150 is configured to generate an output associated with visual sense, auditory sense or tactile sense, and may include a display unit 151, an audio output module 153, an alarm unit 154, a haptic module 155, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a mobile terminal body through a region occupied by the display unit 151 of the mobile terminal body.

Two or more display units 151 may be implemented according to a configured aspect of the mobile terminal 100. For instance, a plurality of the display units 151 may be arranged on one surface to be spaced apart from or integrated with each other, or may be arranged on different surfaces.

Furthermore, the display unit 151 may be configured with a stereoscopic display unit 152 for displaying a stereoscopic image.

Here, stereoscopic image indicates a 3-dimensional stereoscopic image, and the 3-dimensional stereoscopic image is an image for allowing the user to feel the gradual depth and reality of an object located on the monitor or screen as in a real space. The 3-dimensional stereoscopic image may be implemented by using binocular disparity. Here, binocular disparity denotes a disparity made by the location of two eyes separated from each other, allowing the user to feel the depth and reality of a stereoscopic image when two eyes see different two-dimensional images and then the images are transferred through the retina and merged in the brain as a single image.

A stereoscopic method (glasses method), an auto-stereoscopic method (no-glasses method), a projection method (holographic method), and the like may be applicable to the stereoscopic display unit 152. The stereoscopic method primarily used in a home television receiver and the like may include a Wheatstone stereoscopic method and the like.

The examples of the auto-stereoscopic method may include a parallel barrier method, a lenticular method, an integral imaging method, and the like. The projection method may include a reflective holographic method, a transmissive holographic method, and the like.

In general, a 3-dimensional stereoscopic image may include a left image (image for the left eye) and a right image (image for the right eye). The method of implementing a 3-dimensional stereoscopic image can be divided into a top-down method in which a left image and a right image are disposed at the top and bottom within a frame, a left-to-right (L-to-R) or side by side method in which a left image and a right image are disposed at the left and right within a frame, a checker board method in which the pieces of a left image and a right image are disposed in a tile format, an interlaced method in which a left and a right image are alternately disposed for each column and row unit, and a time sequential or frame by frame method in which a left image and a right image are alternately displayed for each time frame, according to the method of combining a left image and a right image into a 3-dimensional stereoscopic image.

For 3-dimensional thumbnail images, a left image thumbnail and a right image thumbnail may be generated from the left and the right image of the original image frame, and then combined with each other to generate a 3-dimensional stereoscopic image. Typically, thumbnail denotes a reduced image or reduced still video. The left and right thumbnail image generated in this manner are displayed with a left and right distance difference on the screen in a depth corresponding to the disparity of the left and right image, thereby implementing a stereoscopic space feeling.

A left image and a right image required to implement a 3-dimensional stereoscopic image are displayed on the stereoscopic display unit 152 by a stereoscopic processing unit (not shown). The stereoscopic processing unit receives a 3D image to extract a left image and a right image from the 3D image, or receives a 2D image to convert it into a left image and a right image.

On the other hand, when the display unit 151 and a touch sensitive sensor (hereinafter, referred to as a "touch sensor") have an interlayer structure (hereinafter, referred to as a "touch screen"), the display unit 151 may be used as an input device in addition to an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. The touch sensor may be configured to sense not only a touched position and a touched area, but also a touch pressure at which a touch object body is touched on the touch sensor. Here, the touch object body may be a finger, a touch pen or stylus pen, a pointer, or the like as an object by which a touch is applied to the touch sensor.

When there is a touch input to the touch sensor, the corresponding signals are transmitted to a touch controller. The touch controller processes the signal(s), and then transmits the corresponding data to the controller 180. Accordingly, the controller 180 may sense which region of the display unit 151 has been touched.

Referring to FIG. 1, a proximity sensor 141 may be arranged at an inner region of the mobile device 100 surrounded by the touch screen, or adjacent to the touch screen. The proximity sensor 141 may be provided as an example of the sensing unit 140. The proximity sensor 141 refers to a sensor to sense the presence or absence of an object approaching to a surface to be sensed, or an object disposed adjacent to a surface to be sensed, by using an electromagnetic field or infrared rays without a mechanical contact. The proximity sensor 141 has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity of an object having conductivity (hereinafter, referred to as a "pointer") to the touch screen is sensed by changes of an electromagnetic field. In this case, the touch screen (touch sensor) may be categorized into a proximity sensor.

Hereinafter, for the sake of convenience of brief explanation, a behavior that the pointer is positioned to be proximate onto the touch screen without contact will be referred to as a "proximity touch", whereas a behavior that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor 141 senses a proximity touch, and a proximity touch pattern (e.g., proximity touch distance, proximity touch direction, proximity touch speed, proximity touch time, proximity touch position, proximity touch moving status, etc.). Information relating to the sensed proximity touch and the sensed proximity touch patterns may be output onto the touch screen.

When the stereoscopic display unit 152 and a touch sensor are configured with an interlayer structure (hereinafter, referred to as a "stereoscopic touch screen") or the stereoscopic display unit 152 and a 3D sensor for detecting a touch operation are combined with each other, the stereoscopic display unit 152 may be used as a 3-dimensional input device.

As an example of the 3D sensor, the sensing unit 140 may include a proximity sensor 141, a stereoscopic touch sensing unit 142, a ultrasound sensing unit 143, and a camera sensing unit 144.

The proximity sensor 141 measures a distance between the sensing object (for example, the user's finger or stylus pen) and a detection surface to which a touch is applied using an electromagnetic field or infrared rays without a mechanical contact. The terminal may recognize which portion of a stereoscopic image has been touched by using the measured distance. In particular, when the touch screen is implemented with a capacitance type, it may be configured such that the proximity level of a sensing object is sensed by changes of an electromagnetic field according to the proximity of the sensing object to recognize a 3-dimensional touch using the proximity level.

The stereoscopic touch sensing unit 142 may be configured to sense the strength or duration time of a touch applied to the touch screen. For example, stereoscopic touch sensing unit 142 senses a user applied touch pressure, and if the applied pressure is strong, then the stereoscopic touch sensing unit 142 recognizes it as a touch for an object located farther from the touch screen.

The ultrasound sensing unit 143 may be configured to sense the location of the sensing object using ultrasound.

For example, the ultrasound sensing unit 143 may be configured with an optical sensor and a plurality of ultrasound sensors. The optical sensor may be formed to sense light, and the ultrasound sensor may be formed to sense ultrasound waves. Since light is far faster than ultrasound waves, the time for light to reach the optical sensor is far faster than the time for ultrasound waves to reach the ultrasound sensor. Accordingly, the location of the wave generating source may be calculated using a time difference between the light and ultrasound waves to reach the optical sensor.

The camera sensing unit 144 may include at least one of a camera 121, a photo sensor, and a laser sensor.

For example, the camera 121 and laser sensor may be combined to each other to sense a touch of the sensing object to a 3-dimensional stereoscopic image. Distance information sensed by the laser sensor is added to a two-dimensional image captured by the camera to acquire 3-dimensional information.

For another example, a photo sensor may be deposited on the display element. The photo sensor may be configured to scan the motion of the sensing object in proximity to the touch screen. More specifically, the photo sensor is integrated with photo diodes and transistors in the rows and columns thereof, and a content placed on the photo sensor may be scanned by using an electrical signal that is changed according to the amount of light applied to the photo diode. In other words, the photo sensor performs the coordinate calculation of the sensing object according to the changed amount of light, and the location coordinate of the sensing object may be detected through this.

The audio output module 153 may output audio data received from the wireless communication unit 110 or stored in the memory 160, in a call-receiving mode, a call-placing mode, a recording mode, a voice recognition mode, a broadcast reception mode, and so on. The audio output module 153 may output audio signals relating to the functions performed in the mobile terminal 100 (e.g., sound alarming a call received or a message received, and so on). The audio output module 153 may include a receiver, a speaker, a buzzer, and so on.

The alarm 154 outputs signals notifying occurrence of events from the mobile terminal 100. The events occurring from the mobile terminal 100 may include call received, message received, key signal input, touch input, and so on. The alarm 154 may output not only video or audio signals, but also other types of signals such as signals notifying occurrence of events in a vibration manner. Since the video or audio signals can be output through the display unit 151 or the audio output unit 153, the display unit 151 and the audio output module 153 may be categorized into part of the alarm 154.

The haptic module 155 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 155 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 155 may be configured to transmit tactile effects through a user's direct contact, or a user's muscular sense using a finger or a hand. The haptic module 155 may be implemented in two or more in number according to the configuration of the mobile terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the mobile terminal with external devices connected to the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

On the other hand, the identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

Furthermore, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

Furthermore, the controller 180 can perform a pattern recognition processing so as to recognize writing or drawing input carried out on the touch screen as text or image.

Furthermore, the controller 180 may implement a lock state for limiting the user's control command input to applications when the state of the mobile terminal satisfies a preset condition. Furthermore, the controller 180 may control a lock screen displayed in the lock state based on a touch input sensed through the display unit 151 in the lock state.

The power supply unit 190 receives external and internal power to provide power required for various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions described in the present disclosure may be implemented with separate software modules. Each of the software modules may perform at least one function or operation described in the present disclosure.

Software codes can be implemented by a software application written in any suitable programming language. The software codes may be stored in the memory 160 and executed by the controller 180.

Next, a communication system that can be implemented through the mobile terminal 100 according to the present disclosure will be described.

Figure 2A:
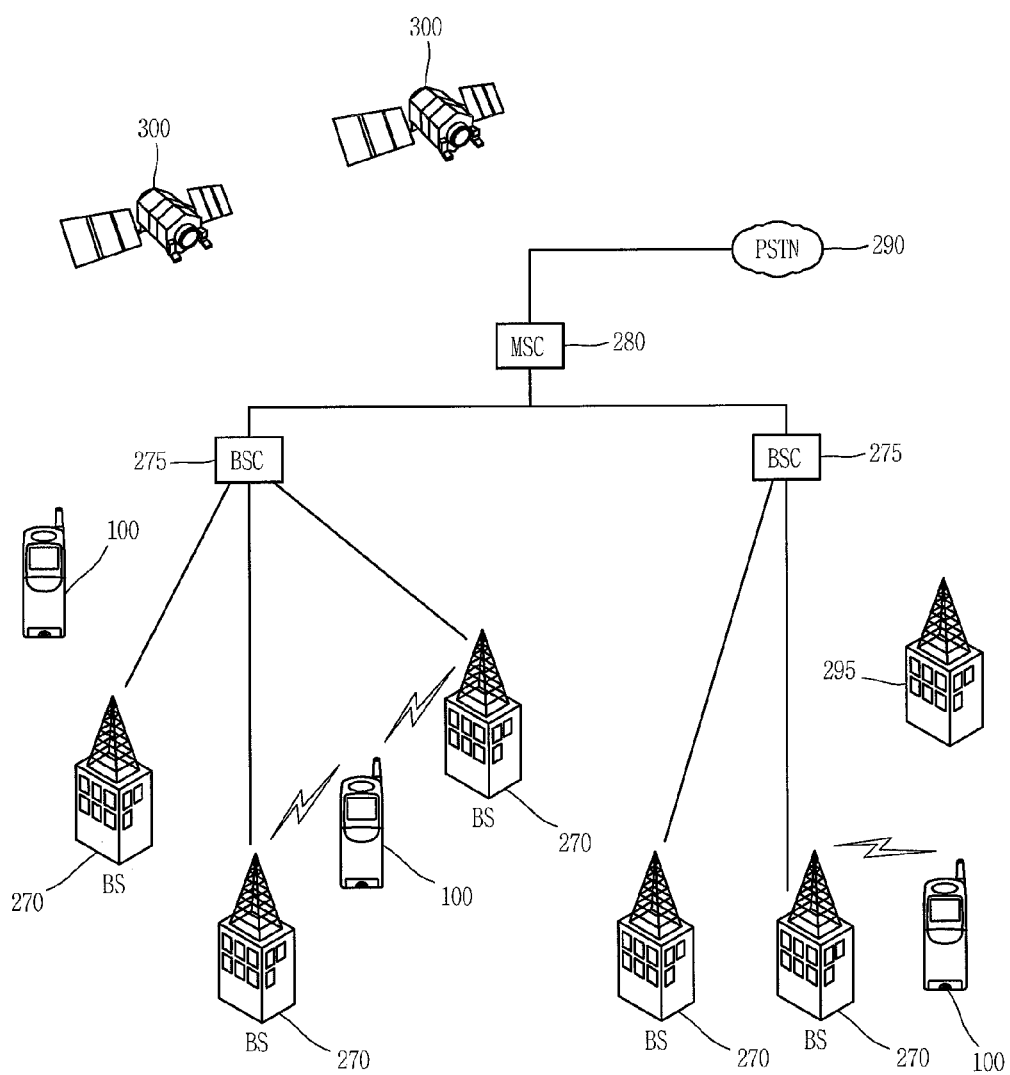
FIGS. 2A and 2B are conceptual views illustrating a communication system in which a mobile terminal according to the present disclosure is operable.
Figure 2B:
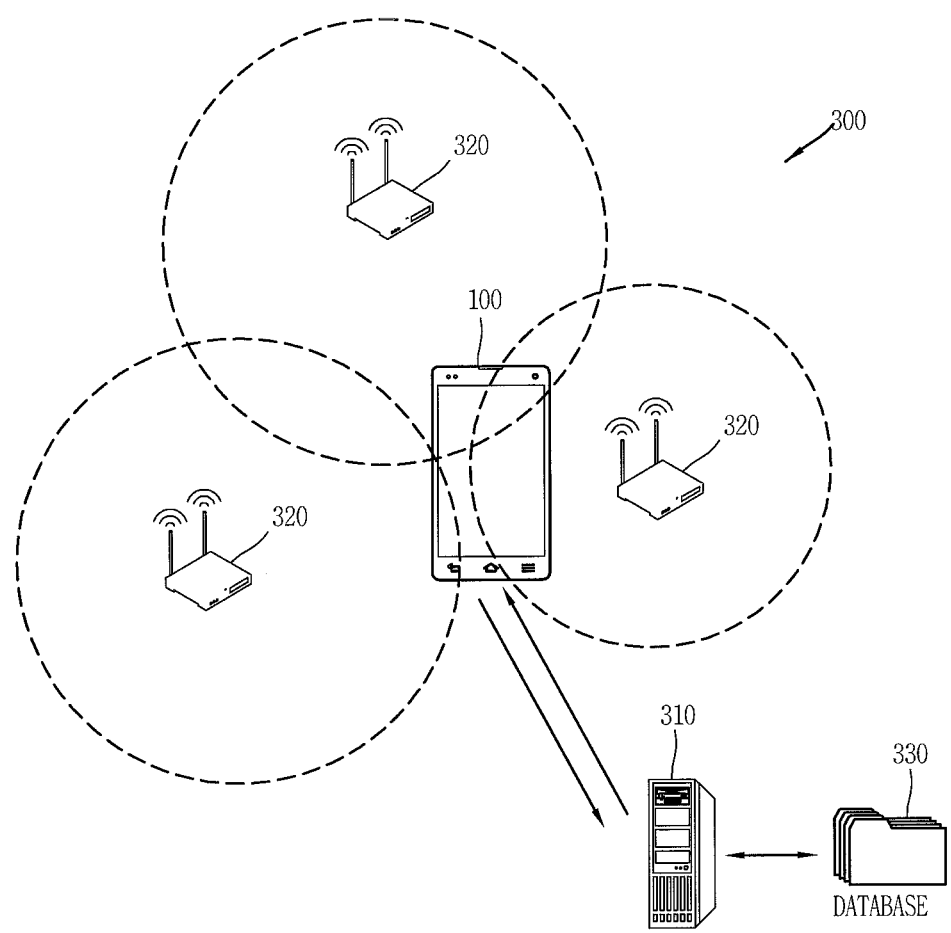

FIGS. 2A and 2B are conceptual views illustrating a communication system in which a mobile terminal 100 according to the present disclosure is operable.

First, referring to FIG. 2A, the communication system may use different wireless interfaces and/or physical layers. For example, wireless interfaces that can be used by the communication system may include, frequency division multiple access (FDMA), time division multiple access (TDMA), code division multiple access (CDMA), universal mobile telecommunications system (UMTS) (particularly, long term evolution (LTE)), global system for mobile communications (GSM), and the like.

Hereinafter, for the sake of convenience of explanation, the description disclosed herein will be limited to CDMA. However, it is apparent that the present invention may be also applicable to all communication systems including a CDMA wireless communication system.

As illustrated in FIG. 2A, a CDMA wireless communication system may include a plurality of terminals 100, a plurality of base stations (BSs) 270, a plurality of base station controllers (BSCs) 275, and a mobile switching center (MSC) 280. The MSC 280 may interface with a Public Switched Telephone Network (PSTN) 290, and the MSC 280 may also interface with the BSCs 275. The BSCs 275 may be connected to the BSs 270 via backhaul lines. The backhaul lines may be configured in accordance with at least any one of E1/T1, ATM, IP, PPP, Frame Relay, HDSL, ADSL, or xDSL, for example. Further, the system illustrated in FIG. 2A may include a plurality of BSCs 275.

Each of the plurality of BSs 270 may include at least one sector, each sector having an omni-directional antenna or an antenna indicating a particular radial direction from the base station 270. Alternatively, each sector may include two or more antennas with various forms. Each of the BSs 270 may be configured to support a plurality of frequency assignments, each frequency assignment having a particular spectrum (for example, 1.25 MHz, 5 MHz, etc.).

The intersection of a sector and frequency assignment may be referred to as a CDMA channel. The BSs 270 may also be referred to as Base Station Transceiver Subsystems (BTSs). In this case, the term "base station" may collectively refer to a BSC 275, and at least one BS 270. The base stations may also indicate "cell sites". Alternatively, individual sectors for a specific BS 270 may also be referred to as a plurality of cell sites.

As illustrated in FIG. 2A, the Broadcasting Transmitter (BT) 295 may transmit broadcasting signals to the mobile terminals 100 being operated within the system. The broadcast receiving module 111 as illustrated in FIG. 1 may be provided in the mobile terminal 100 to receive broadcast signals transmitted by the BT 295.

In addition, FIG. 2A illustrates several global positioning system (GPS) satellites 300. Such satellites 300 facilitate locating at least one of a plurality of mobile terminals 100. Though two satellites are illustrated in FIG. 2A, location information may be obtained with a greater or fewer number of satellites. The location information module 115 as illustrated in FIG. 1 may cooperate with the satellites 300 as illustrated in FIG. 2A to obtain desired location information. However, other types of position detection technology, all types of technologies capable of tracing the location may be used in addition to a GPS location technology. Furthermore, at least one of the GPS satellites 300 may alternatively or additionally provide satellite DMB transmissions.

During the operation of a wireless communication system, the BS 270 may receive reverse-link signals from various mobile terminals 100. At this time, the mobile terminals 100 may perform calls, message transmissions and receptions, and other communication operations. Each reverse-link signal received by a specific base station 270 may be processed within that specific base station 270. The processed resultant data may be transmitted to an associated BSC 275. The BSC 275 may provide call resource allocation and mobility management functions including the systemization of soft handoffs between the base stations 270. Furthermore, the BSCs 275 may also transmit the received data to the MSC 280, which provides additional transmission services for interfacing with the PSTN 290. Furthermore, similarly, the PSTN 290 may interface with the MSC 280, and the MSC 280 may interface with the BSCs 275. The BSCs 275 may also control the BSs 270 to transmit forward-link signals to the mobile terminals 100.

Next, a method of acquiring the location information of a mobile terminal using a WiFi (Wireless Fidelity) positioning system (WPS) will be described with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the mobile terminal 100 may be transmitted to the mobile terminal 100 through the WiFi location determination server 310, thereby acquiring the location information of the mobile terminal 100.

Hereinafter, a mobile terminal according to an embodiment of the present disclosure as illustrated in FIG. 1 or a mobile terminal disposed with the constituent elements of the mobile terminal or the structure of a mobile terminal will be described.

Figure 3A:
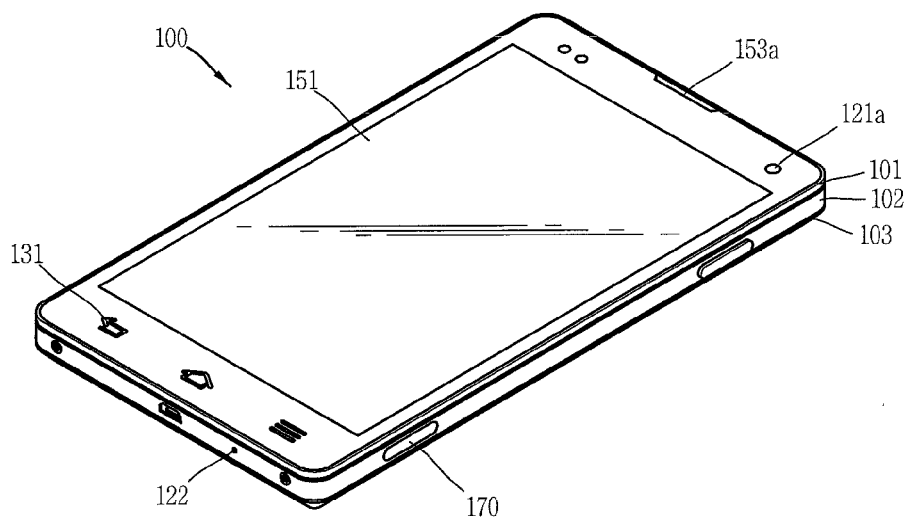
FIG. 3A is a front perspective view illustrating an example of a mobile terminal associated with the present disclosure.

FIG. 3A is a front perspective view illustrating an example of the mobile terminal 100 associated with the present disclosure.

The mobile terminal 100 disclosed herein is provided with a bar-type terminal body. However, the present invention may not be limited to this, but also may be applicable to various structures such as watch type, clip type, glasses type or folder type, flip type, swing type, swivel type, or the like, in which two and more bodies are combined with each other in a relatively movable manner.

The body includes a case (casing, housing, cover, etc.) forming the appearance of the terminal. In this embodiment, the case may be divided into a front case 101 and a rear case 102. Various electronic components is incorporated into a space formed between the front case 101 and the rear case 102. At least one middle case may be additionally disposed between the front case 101 and the rear case 102, and a battery cover 103 for covering the battery 191 may be detachably configured at the rear case 102.

The cases may be formed by injection-molding a synthetic resin or may be also formed of a metal, for example, stainless steel (STS), titanium (Ti), or the like.

A display unit 151, a first audio output module 153a, a first camera 121a, a first manipulating unit 131 and the like may be disposed on a front surface of the terminal body, and a microphone 122, an interface unit 170, a second manipulating unit 132 and the like may be provided on a lateral surface thereof.

The display unit 151 may be configured to display (output) information being processed in the mobile terminal 100. The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

The display unit 151 may include a touch sensing means to receive a control command by a touch method. When a touch is made to any one place on the display unit 151, the touch sensing means may be configured to sense this touch and enter the content corresponding to the touched place. The content entered by a touch method may be a text or numerical value, or a menu item capable of indication or designation in various modes.

The touch sensing means may be formed with transparency to allow visual information displayed on the display unit 151 to be seen, and may include a structure for enhancing the visibility of a touch screen at bright places. Referring to FIG. 3A, the display unit 151 occupies a most portion of the front surface of the front case 101.

The first audio output unit 153*a* and the first camera 121*a* are disposed in a region adjacent to one of both ends of the display unit 151, and the first manipulation input unit 131 and the microphone 122 are disposed in a region adjacent to the other end thereof. The second manipulation interface 132 (refer to FIG. B), the interface 170, and the like may be disposed on a lateral surface of the terminal body.

The first audio output module 153*a* may be implemented in the form of a receiver for transferring voice sounds to the user's ear or a loud speaker for outputting various alarm sounds or multimedia reproduction sounds.

It may be configured such that the sounds generated from the first audio output module 153*a* are released along an assembly gap between the structural bodies. In this case, a hole independently formed to output audio sounds may not be seen or hidden in terms of appearance, thereby further simplifying the appearance of the mobile terminal 100. However, the present invention may not be limited to this, but a hole for releasing the sounds may be formed on the window.

The first camera 121*a* processes video frames such as still or moving images obtained by the image sensor in a video call mode or capture mode. The processed video frames may be displayed on the display unit 151.

The user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed if it is a tactile manner allowing the user to perform manipulation with a tactile feeling such as touch, push, scroll or the like.

In the present drawing, it is illustrated on the basis that the first manipulation unit 131 is a touch key, but the present disclosure may not be necessarily limited to this. For example, the first manipulation unit 131 may be configured with a mechanical key, or a combination of a touch key and a mechanical key.

The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being outputted from the first audio output module 153*a*, or switching into a touch recognition mode of the display unit 151.

The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module (SIM) or User Identity Module (UIM), and a memory card for information storage.

Figure 3B:
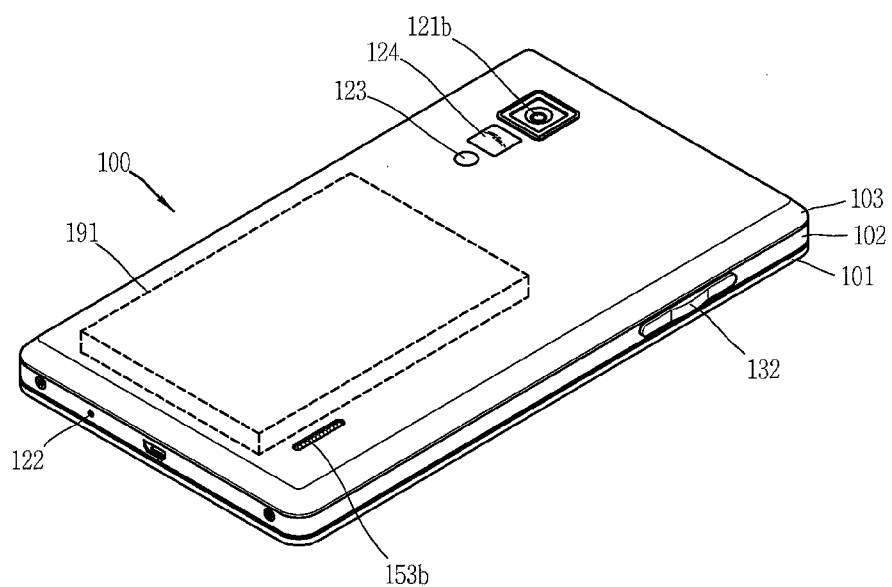
FIG. 3B is a rear perspective view illustrating a mobile terminal illustrated in FIG. 3A.

FIG. 3B is a rear perspective view illustrating mobile terminal 100 illustrated in FIG. 3A.

Referring to FIG. 3B, a second camera 121*b* may be additionally mounted at a rear surface of the terminal body, namely, the rear case 102. The second camera 121*b* has an image capturing direction, which is substantially opposite to the direction of the first camera unit 121*a* (refer to FIG. 3A), and may have a different number of pixels from that of the first camera unit 121*a*.

For example, it is preferable that the first camera 121*a* has a relatively small number of pixels enough not to cause difficulty when the user captures his or her own face and sends it to the other party during a video call or the like, and the second camera 121*b* has a relatively large number of pixels since the user often captures a general object that is not sent immediately. The first and the second camera 121*a*, 121*b* may be provided in the terminal body in a rotatable and popupable manner.

Furthermore, a flash 123 and a mirror 124 may be additionally disposed adjacent to the second camera 121*b*. The flash 123 illuminates light toward an object when capturing the object with the second camera 121*b*. The mirror 124 allows the user to look at his or her own face, or the like, in a reflected way when capturing himself or herself (in a self-portrait mode) by using the second camera 121*b*.

A second audio output unit 153*b* may be additionally disposed at a rear surface of the terminal body. The second audio output unit 153*b* together with the first audio output unit 153*a* (refer to FIG. 3A) can implement a stereo function, and may be also used to implement a speaker phone mode during a phone call.

An antenna (not shown) for receiving broadcast signals may be additionally disposed at a lateral surface of the terminal body in addition to an antenna for making a phone call or the like. The antenna constituting part of the broadcast receiving module 111 (refer to FIG. 1) may be provided in the terminal body in a retractable manner.

A power supply unit 190 (refer to FIG. 1) for supplying power to the mobile terminal 100 may be mounted on the terminal body. The power supply unit 190 may be incorporated into the terminal body, or may include a battery 191 configured in a detachable manner on the outside of the terminal body. According to the drawing, it is illustrated that the battery cover 103 is combined with the rear case 102 to cover the battery 191, thereby restricting the battery 191 from being released and protecting the battery 191 from external shocks and foreign substances.

Owing to the enhancement, an image that has captured various objects such as humans, things or the like may be generated through a camera of the terminal. However, when the image is generated only in case where the user directly touches a capture button of the terminal camera, it may cause a problem of missing his or her desired scene.

Furthermore, there has been some inconvenience in viewing images that have been captured for the same object or images that have been captured within a predetermined period of time in an all-at-once or successive manner.

Accordingly, a mobile terminal 100 capable of enhancing the user's convenience in displaying a plurality of images in a successively linked manner and a control method thereof will be described with reference to the accompanying drawings.

The terms including an ordinal number such as first, second, etc. can be used to describe various elements, but the elements should not be limited by those terms. The terms are used merely for the purpose to distinguish an element from the other element.

For example, a first element may be named to a second element, and similarly, a second element may be named to a first element without departing from the scope of right of the invention.

Figure 4A:
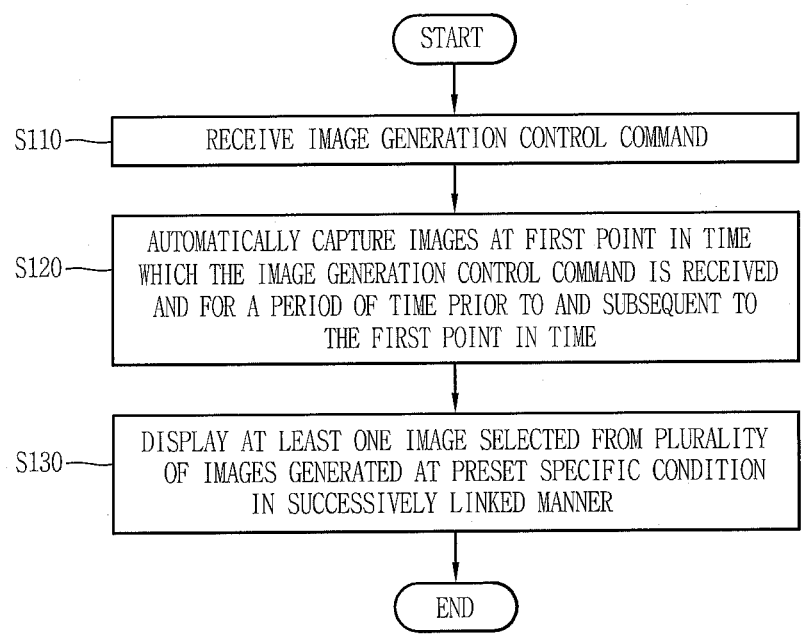
FIGS. 4A and 4B are flow charts for explaining a mobile terminal according to an embodiment of the present disclosure.
Figure 4B:
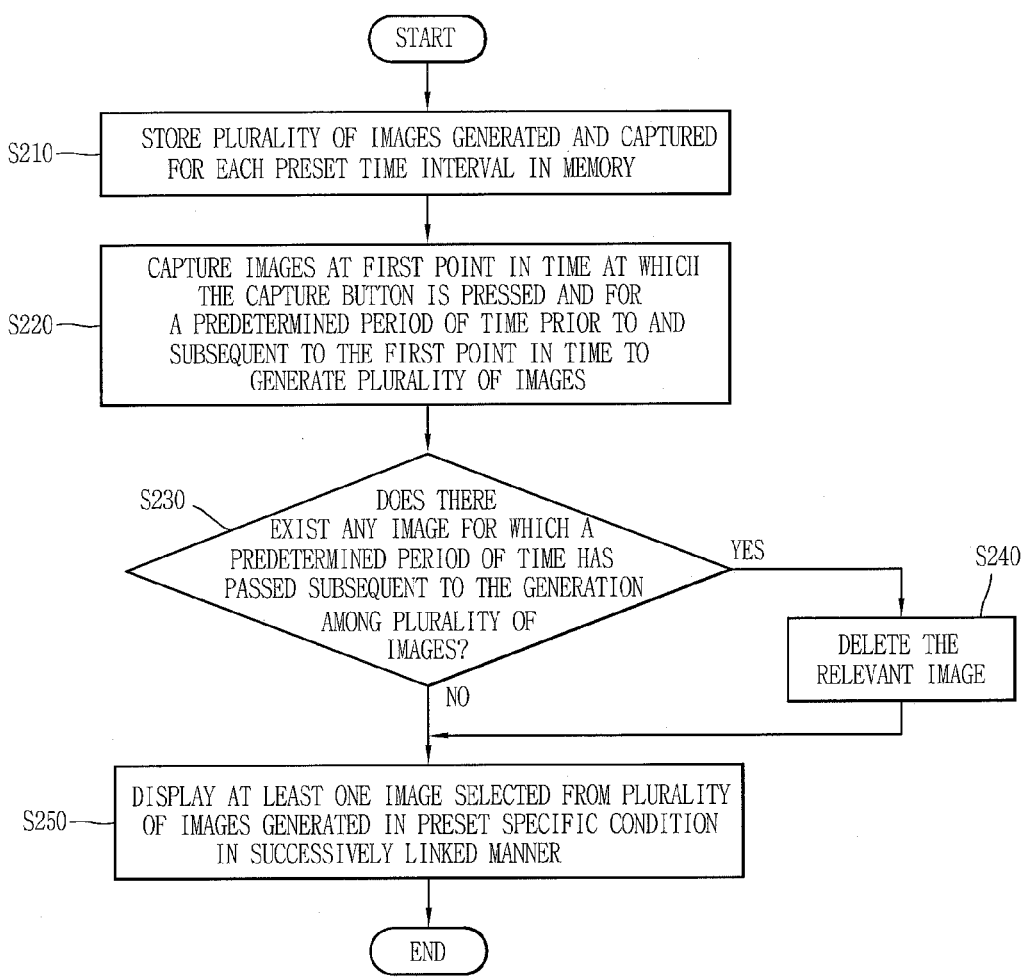
Figure 5:
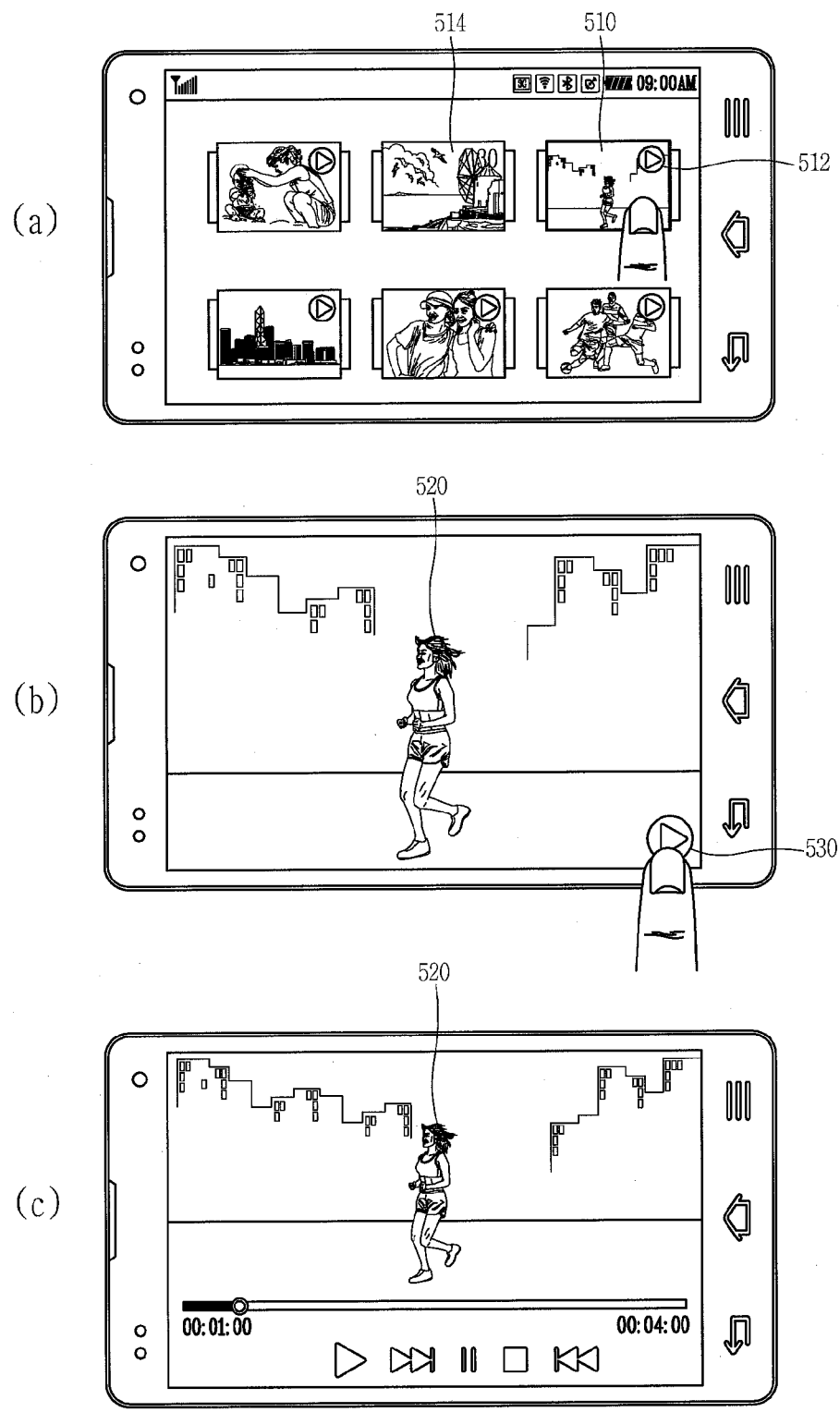
FIGS. 5, 6A, 6B, 7A and 7B are conceptual views illustrating a user interface configured to reproduce a plurality of images in a successively linked manner according to an embodiment.

FIGS. 4A and 4B are flow charts for explaining a mobile terminal 100 (refer to FIG. 1) according to an embodiment of the present disclosure. The mobile terminal 100 may include an image generation unit, a display unit 151 and a controller 180.

Referring to FIG. 4A, first, the process (S110) of receiving an image generation control command is carried out.

Specifically, the user may touch a capture button of the camera 121 to enter an image generation control command. Otherwise, the user may push a capture button of the camera 121 implemented with a physical key to enter an image generation control command.

Subsequently, the process (S120) of automatically capturing images at a first point in time at which an image generation control command is received and for a period of time prior to and subsequent to the first point in time is carried out.

Specifically, an image is captured and generated at a point in time at which a capture button of the camera 121 is selected. Furthermore, images are automatically captured and generated in advance for a predetermined period of time prior to selecting the capture button, and images are automatically captured and generated for a predetermined period of time even subsequent to selecting the capture button. In other words, images can be automatically captured without selecting the capture button.

Next, the process (S130) of displaying images captured and generated at a second point in time which is a point in time subsequent to the first point in time at which an image generation control command is received and for a period of time prior to and subsequent to the second point in time and at least one image selected from the images generated during the process of S120 in a successively linked manner is carried out.

Specifically, at least one image between the first and the second points in time is automatically captured and stored in a preset specific condition.

The preset specific condition may be set to a case where the capture button is successively touched within a previously set predetermined period of time, a case where the capture button is successively touched within a previously set predetermined distance, a case where a specific object is contained in an image generated at each point in time at which the capture button touched, and the like.

Furthermore, images automatically captured for a predetermined period of time prior to and subsequent to the first and the second points in time may be overlapped with images automatically captured when a preset specific condition is satisfied between the foregoing first and the second point in time.

Specifically, when the capture button is selected at a first point in time and the capture button is selected again at a second point in time within 10 seconds from the first point in time, images are automatically captured and stored even when the capture button is not selected for at least one image between the first and the second points in time.

For still another embodiment, a first image is captured by pressing the capture button in the vicinity of Eiffel Tower, and then a second image is captured by pressing the capture button again within a radius of 1 m from the point where the first image has been captured. In this case, images may be automatically captured and stored even when the capture button is not selected prior to capturing the second image but subsequent to capturing the first image.

For yet still another embodiment, a first and a second image which are the features of a moving kid may be captured by pressing the capture button. Similarly, images may be automatically captured and stored even when the capture button is not selected prior to capturing the second image but subsequent to capturing the first image.

Furthermore, according to each embodiment, part of a plurality of images captured and generated at each point in time at which the capture button is touched and prior to and subsequent to the each point in time may be displayed in a successively linked manner.

On the other hand, it may be possible to enter a specific capture mode to automatically obtain an image even when the capture button is not touched, and in this case, images may be automatically captured and generated in a continuous manner prior to releasing the relevant capture mode even without touching the capture button.

Specifically, when the preset specific condition is satisfied even without touching the capture button while being in a specific capture mode, images may be automatically captured and generated in a continuous manner.

According to another embodiment, images may be automatically captured and generated all the time even without entering a capture mode or touching the capture button. In this case, images for which a predetermined period of time has passed subsequent to the automatic capture may be deleted in consideration of the capacity of the memory 160.

Through the foregoing process, images can be obtained even when the capture button is not captured.

Referring to FIG. 4B, the process (S210) of storing a plurality of images that have been captured and generated for each preset time interval in the memory 160 is carried out.

Subsequently, the process (S220) of capturing and generating a plurality of images at a first point in time at which the capture button is pressed and for a predetermined period of time prior to and subsequent to the first point in time is carried out.

Next, the process (S230) of determining whether or not there exists an image for which a predetermined period of time has passed subsequent to the generation among a plurality of images is carried out.

During the step of S230, when there exists an image for which a predetermined period of time has passed, the process (S240) of deleting the relevant image is carried out.

Subsequently, the process (S250) of displaying at least one image selected from a plurality of images captured and generated at a second point in time at which the capture button is pressed and for a predetermined period of time prior to and subsequent to the second point in time and a plurality of images generated during the step of S220 in a successively linked manner is carried out.

At this time, the step of S250 is carried out similarly to the foregoing step of S130 illustrated in FIG. 4A.

On the other hand, automatically captured images described in FIGS. 4A and 4B may be still or moving images.

FIGS. 5, 6A, 6B, 7A and 7B are conceptual views illustrating a user interface configured to reproduce a plurality of images in a successively linked manner according to an embodiment.

Referring to FIG. 5A, the thumbnails of a plurality of photo images displayed in a photo album are shown. An image captured at a point in time at which the capture button is touched may be displayed on each thumbnail, and an indicator indicating that there exist images captured for a period of time prior to and subsequent to touching the capture button may be displayed thereon.

For example, a play button 512 for video, a number 514 of successively linked images or the like may be displayed on the thumbnail. Subsequently, the user may touch and select the thumbnail 510 of an image. Furthermore, other thumbnails overlapped under the thumbnail may be displayed to indicate that there exists a plurality of successively captured images.

Referring to FIG. 5B, when the user touches the thumbnail 510 in FIG. 5A, a photo image corresponding to the thumbnail 510 may be displayed in an enlarged manner. A walking person 520 is contained in the current displayed image.

Referring to FIG. 5C, when a play button 530 displayed at an edge of the image is touched in FIG. 5B, images captured for a predetermined period of time prior to touching the capture button, an image captured at a point in time at which the capture button is touched, and images captured for a predetermined period of time subsequent to touching the capture button may be displayed in a successively linked manner according to the captured sequence.

In other words, video with a plurality of successively linked images may be displayed. For example, video in which the person 520 displayed in FIG. 5B is walking may be displayed with images successively captured prior to and subsequent to the point in time.

Meanwhile, an image captured and generated at the first point in time and an image captured and generated at the second point in time may be displayed adjacent to each other, and a link object for connecting a plurality of adjacent images between a plurality of adjacent images may be displayed.

Figure 6A:
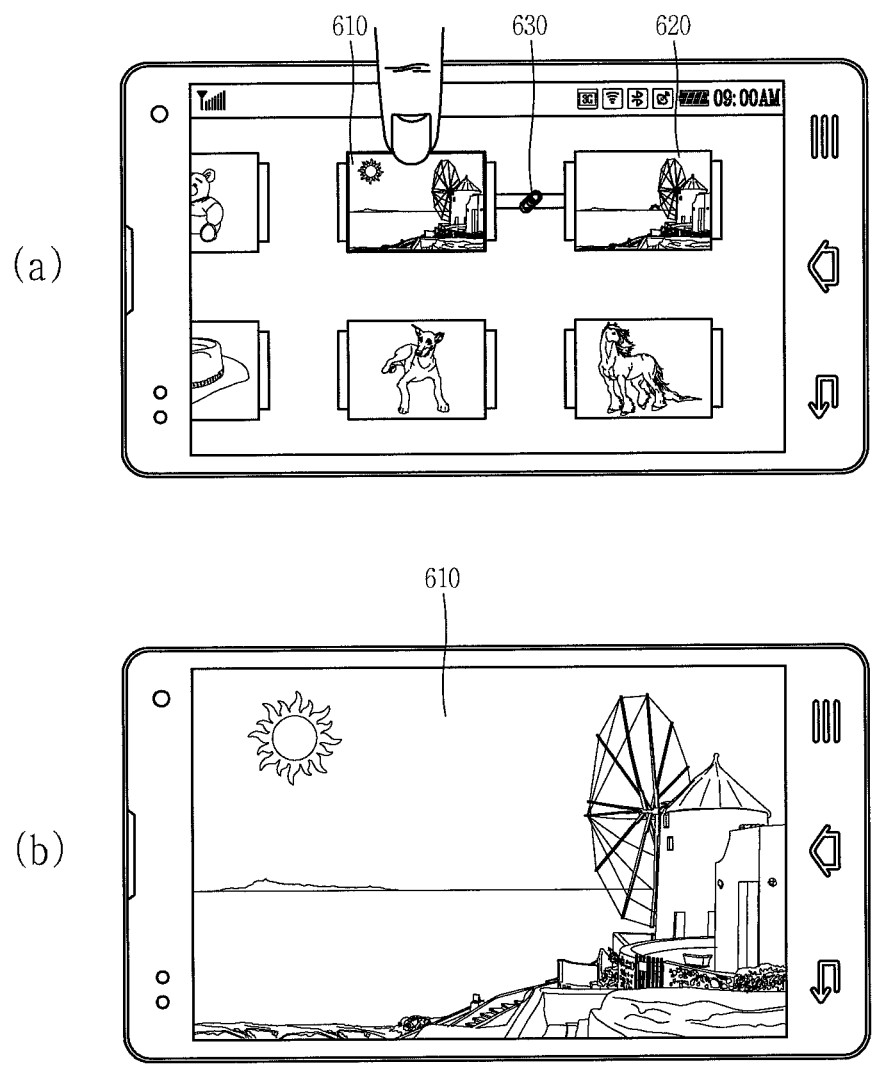

Referring to FIG. 6A(a), an image captured at a point in time at which the capture button is touched is displayed on each thumbnail displayed in the photo album, and a link object connected between each thumbnail may be displayed at the same time.

Specifically, a first thumbnail containing a first image 610 captured at the first point in time and a second thumbnail containing a second image 620 captured at the second point in time may be displayed. Furthermore, a link object 630 in a connecting link shape connected between the first and the second thumbnail may be also displayed.

The link object 630 indicates that connected images can be displayed in a linked manner. The link object 630 may link images captured within a previously set predetermined distance, images successively captured containing the same object, and images successively captured at the same location.

For example, the thumbnails of the first and the second image successively captured within 10 seconds at the same location may be connected with a link object, and may be displayed like one successively linked video.

Referring to FIGS. 6A(b) and 6B(a), when the user touches and selects the first thumbnail in FIG. 6A(a), a first image 610 and images captured for a period of time subsequent to capturing the first image 610 can be successively displayed.

Furthermore, images captured for a period of time prior to capturing a second image 620 connected with the link object 630, the second image 620, a second plurality of images which are images captured for a period of time subsequent to capturing the second image 620 can be successively displayed.

If the second image 620 is linked with a third image through another link object, then images captured for a period of time prior to capturing the third image, the third image, a third plurality of images which are images captured for a period of time subsequent to capturing the third image can be successively displayed.

In the above assumed example, if the user touches and selects the second thumbnail, then the second image 620, images captured for a period of time subsequent to capturing the second image 620, and a plurality of third images can be successively displayed.

In other words, if the thumbnail of a captured image is touched and selected, then images linked with a link object can be displayed in a successively linked manner.

Figure 6B:
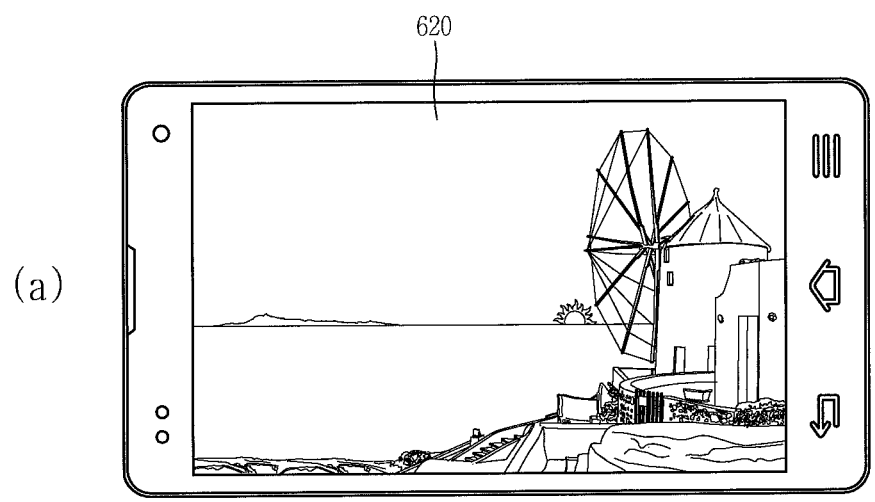
Figure 6B:
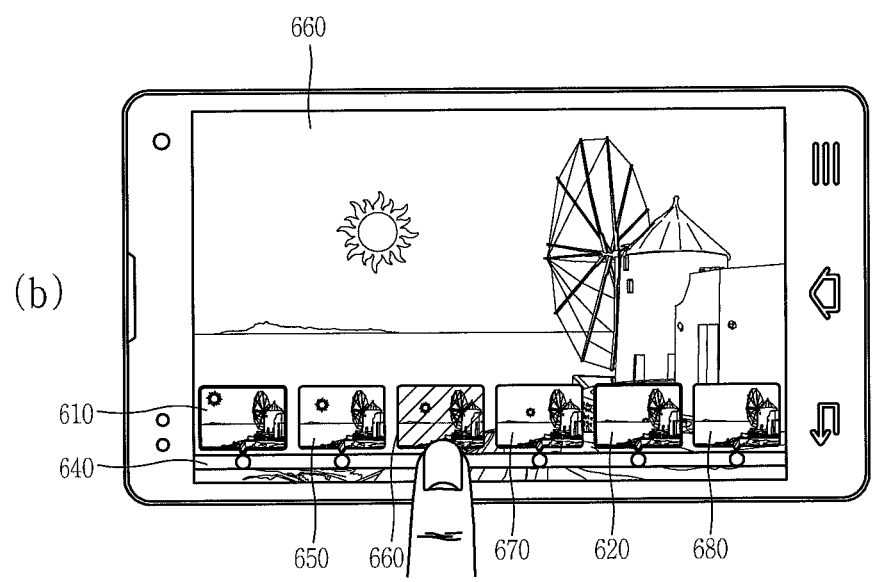

Referring to FIG. 6B(b), each thumbnail containing a reproducible image can be displayed on a play bar 640.

Specifically, a thumbnail of images captured for a period of time prior to capturing the first image 610, a thumbnail of the first image 610, a thumbnail of images 650, 660 captured for period of time subsequent to capturing the first image 610, a thumbnail of images 670 captured for a period of time prior to capturing the second image 620 connected with the link object 630, a thumbnail of the second image 620, a thumbnail of images 680 captured for a period of time subsequent to capturing the second image 620, and the like can be displayed in a successively linked manner on the bar 640.

Furthermore, on the images 610, 620 captured by directly pressing the capture button among thumbnails displayed on the bar 640, an object indicating that they are captured by directly pressing the capture button may be displayed. For example, the frame of the thumbnail can be displayed in a bold manner or the thumbnail can be displayed with a different color.

For another embodiment, when the images 610, 620 captured by directly pressing the capture button are reproduced on the entire screen 151, a flash effect similar to being displayed when pressing the capture button may be displayed. Otherwise, a sound effect such as "click" or the like that is output when pressing the capture button may be output.

For still another embodiment, duplicated images may exist between the first and the second image 610, 620 connected with the link object 630. In other words, common images may exist between images captured for a period of time subsequent to capturing the first image 610 and images captured for a period of time prior to capturing the second image 620.

In this case, only one duplicated image may be displayed. Otherwise, an object indicating the image being duplicated may be displayed. For example, a duplicated image may be displayed only once, indicating a duplication using the displayed image with a different color.

Subsequently, if the user touches and selects the thumbnail of the image 660 displayed on the bar 640, then images 670, 620, 680 displayed on the bar 640 subsequent to the relevant image 660 may be displayed in a successively linked manner.

On the other hand, a first plurality of images captured and generated at a first point in time at which an image generation control command is received and for a period of time prior to and subsequent to the first point in time, and a second plurality of images captured and generated at a second point in time at which an image generation control command is received and for a period of time prior to and subsequent to the second point in time may be displayed adjacent to one another.

Furthermore, an image selected from the first and the second plurality of images and at least one image captured and generated subsequent to the selected image may be displayed in a successively linked manner according to the time sequence.

Figure 7A:
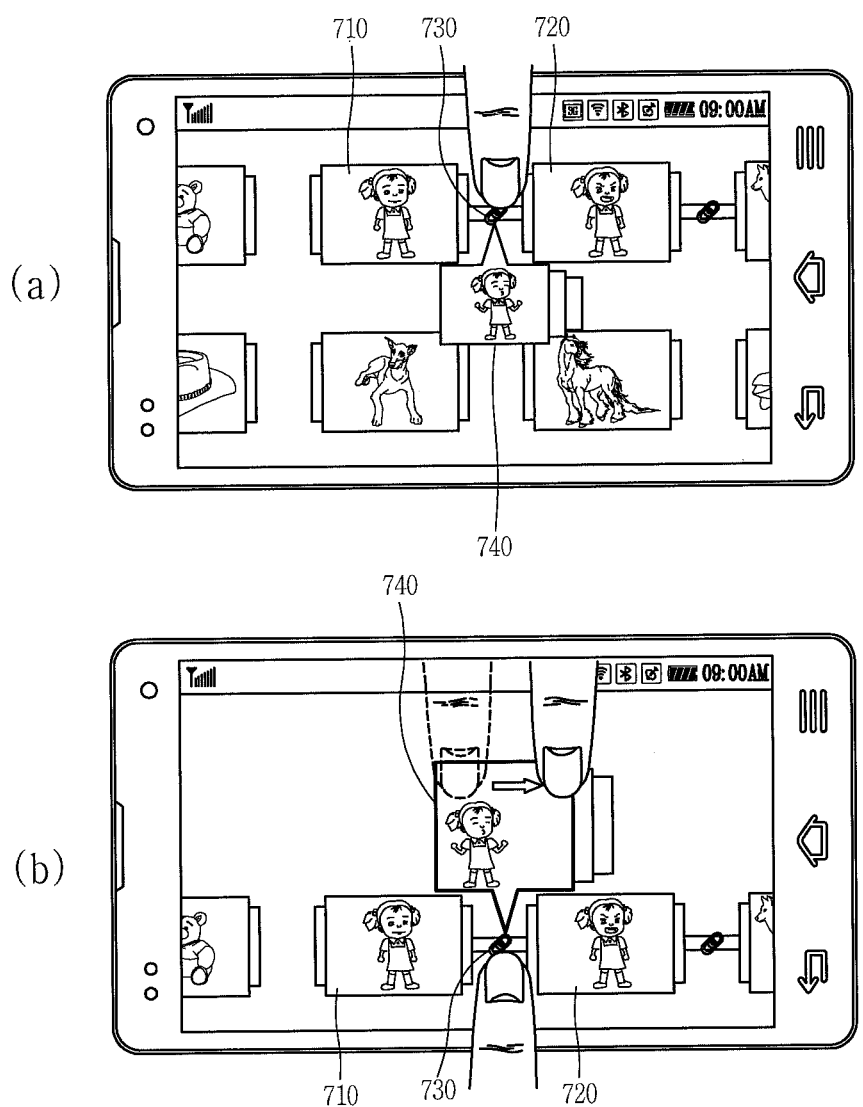

Referring to FIGS. 7A(a) and 7A(b), if a link object 730 connected between the first and the second thumbnail corresponding to the first and the second image 710, 720 is touched and selected, then the thumbnails 740 of images captured for a period of time subsequent to capturing the first image 710 and images captured for a period of time prior to capturing the second image 720 may be unfolded.

Each image may be displayed according to the captured time sequence. Specifically, the thumbnails 740 of images captured for a period of time subsequent to capturing the first image 710 and images captured for a period of time prior to capturing the second image 720 may be displayed according to the captured time sequence.

The thumbnails 740 may be unfolded on the original screen as illustrated in FIG. 7A(a) or unfolded after the screen is converted to create a vacant space as illustrated in FIG. 7A(b). At this time, the user may check it by turning the successive thumbnails 740 using a flicking input.

Figure 7B:
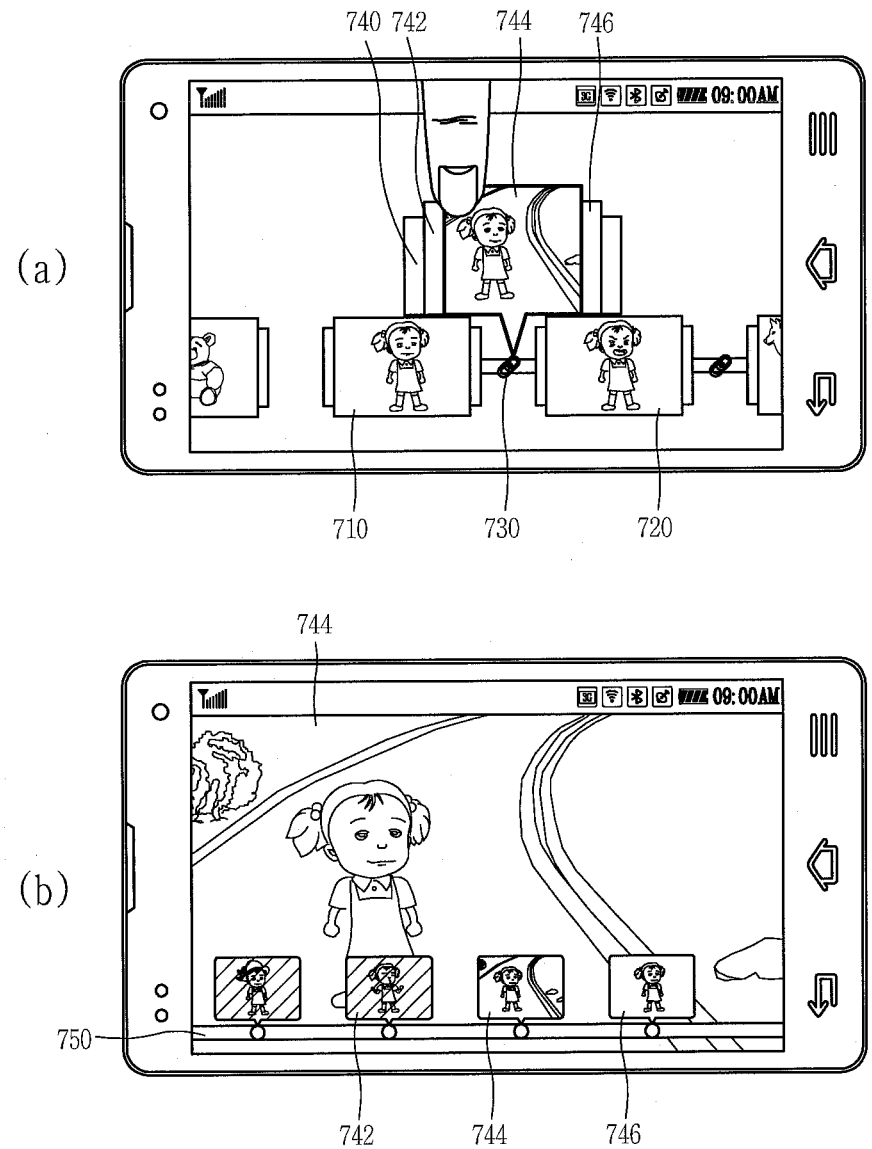

Referring to FIGS. 7B(a) and 7B(b), if the user touches and selects one 744 of the turned over thumbnails, then the images 746 of the thumbnails displayed according to the time sequence from the image 744 of the relevant thumbnail and images 720 captured by pressing the capture button can be displayed.

Specifically, the image 744 of the selected thumbnail, the image 746 of the thumbnail linked subsequent to the selected thumbnail, the second image 720, images captured for a period of time subsequent to capturing the second image 720, images captured for a period of time prior to capturing the third image connected to the second image 720 with a link object, and images captured for a period of time subsequent to capturing the third image may be displayed in a linked manner.

Furthermore, referring to FIG. 7B(b), thumbnails containing each image may be displayed on the play bar 750. At this time, a dim image effect may be added to the thumbnails of previously reproduced images or the thumbnails 742 of images captured prior to the image of the selected thumbnail.

FIGS. 8A, 8B, 9, 10A and 10B are conceptual views illustrating a user interface configured to edit images to be consecutively reproduced according to an embodiment.

Figure 8A:
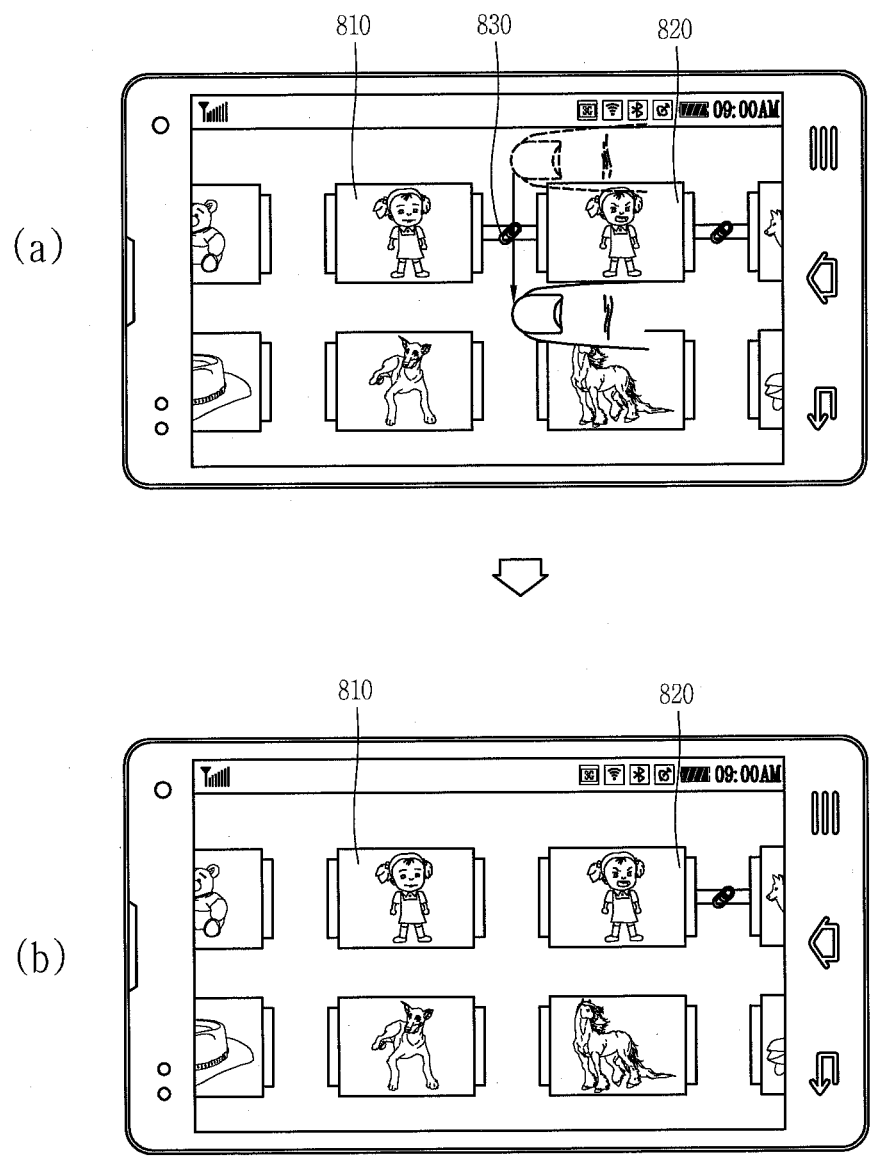
FIGS. 8A, 8B, 9, 10A and 10B are conceptual views illustrating a user interface configured to edit images to be consecutively reproduced according to an embodiment.

Referring to FIGS. 8A(a) and 8A(b), if the user applies a long touch to a link object 830 connected between the first and the second thumbnail 810, 820 or applies a drag input to the link object 830 in the downward direction, then the link object 830 disappears.

As a result, if the first thumbnail 810 is touched, then a first image contained in the first thumbnail and images captured for a period of time subsequent to the first image are displayed in successively linked manner. In other words, a plurality of images (a second image contained in the second thumbnail and images captured prior to and subsequent to the second image capture point in time) corresponding to the second thumbnail 820 are not displayed in a linked manner.

Furthermore, automatically captured images that are not directly captured by pressing the capture button according to a drag input for disconnecting the link object 830 may be all deleted. Specifically, images automatically captured for a predetermined period of time prior to and subsequent to the first and the second image other than the first and the second image can be deleted.

Figure 8B:
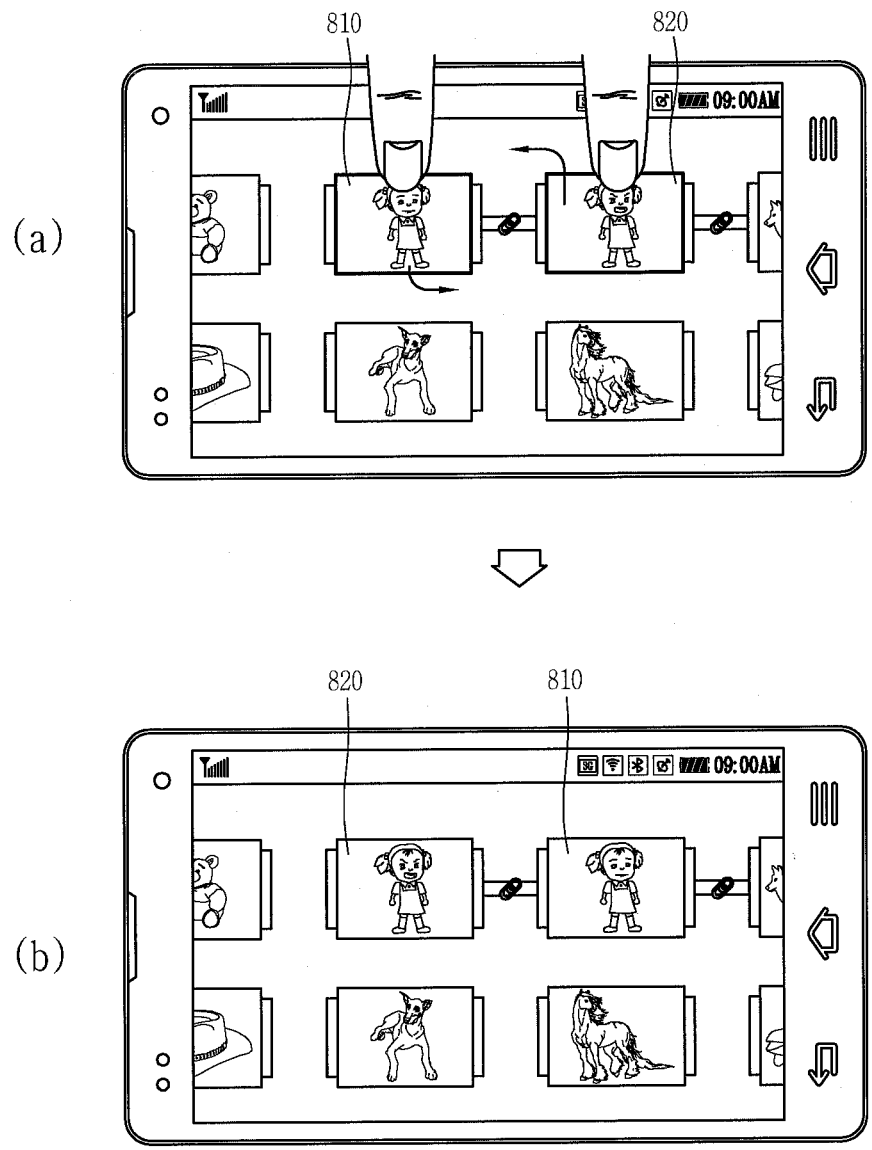

Referring to FIG. 8B(b), when the first and the second thumbnail 810, 820 are touched at the same time and then a drag input is applied in the inward direction or an input for changing the locations of the thumbnails is applied, the locations of the thumbnails 810, 820 will be changed. Accordingly, the sequence of images displayed in a successively linked manner can be changed.

Figure 9:
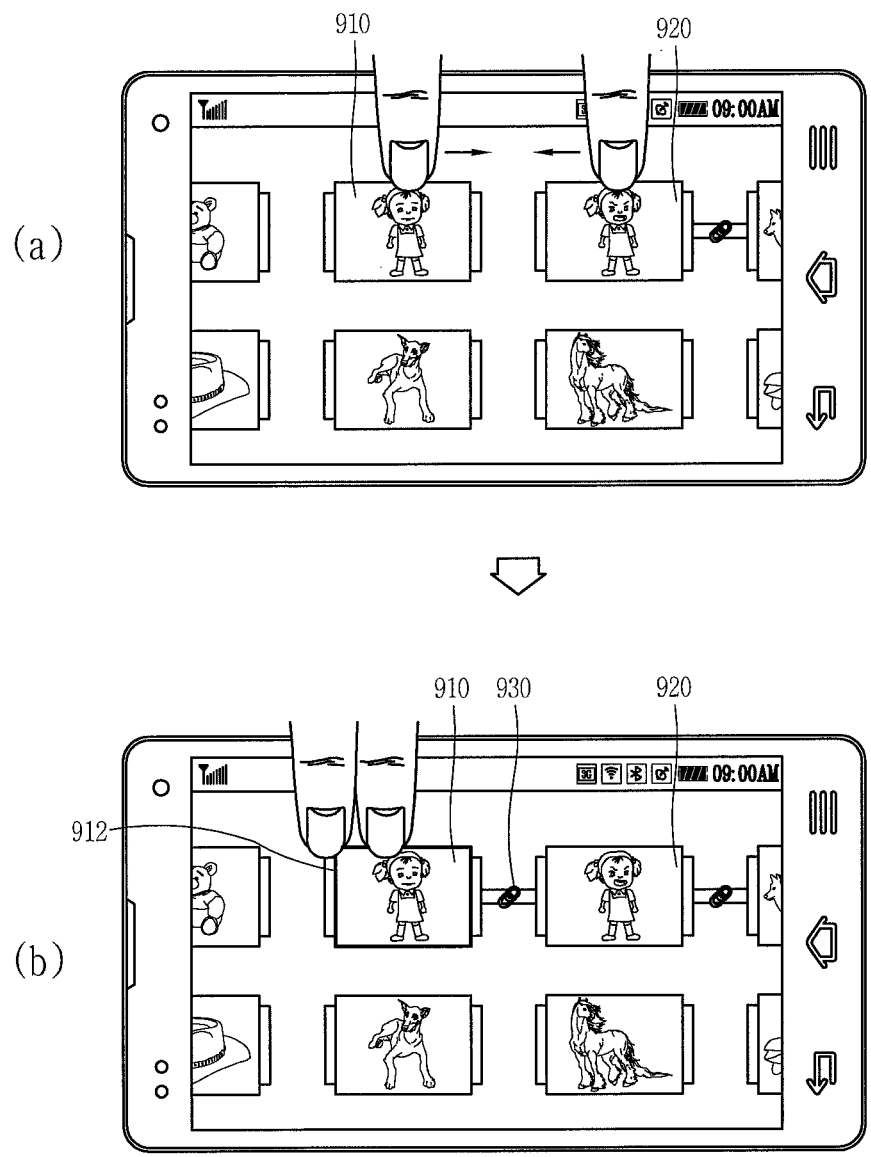

Referring to FIG. 9, when the first and the second thumbnail 910, 920 separated from each other are touched at the same time or a drag input in the inward direction is applied to each of the first and the second thumbnail 910, 920, the first and the second thumbnail 910, 920 can be connected with a link object 930.

As a result, when the user touches the first thumbnail 910, a first image corresponding to the first thumbnail 910, images captured for a period of time subsequent to capturing the first image, a second plurality of images (a second image contained in the second thumbnail 920 and images captured prior to and subsequent to the second image capture point in time) connected with the link object 930 can be displayed in a successively linked manner.

Furthermore, when desired to reproduce images captured for a period of time prior to capturing the first image, a thumbnail 912 overlapped under the first thumbnail 910 can be touched and selected.

Accordingly, a first plurality of images (a first image contained in the first thumbnail 910 and images captured prior to and subsequent to the first image capture point in time) and a second plurality of images (a second image contained in the second thumbnail 920 and images captured prior to and subsequent to the second image capture point in time) can be displayed in a successively linked manner according to the captured time sequence.

On the other hand, at least one image among a first and a second image captured by pressing the capture button and a plurality of images captured for a predetermined period of time prior to and subsequent to capturing the first and the second image may be selected and deleted. Otherwise, the selected at least one image may be added to the plurality of images.

Subsequently, an image selected from the edited plurality of images and at least one image captured subsequent to selecting the selected image can be displayed in a successively linked manner according to the captured time sequence.

Figure 10A:
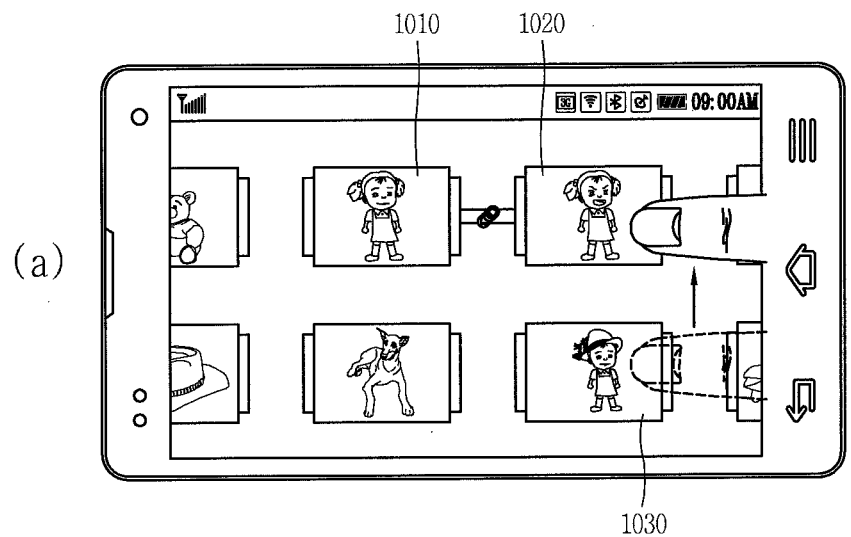
Figure 10A:
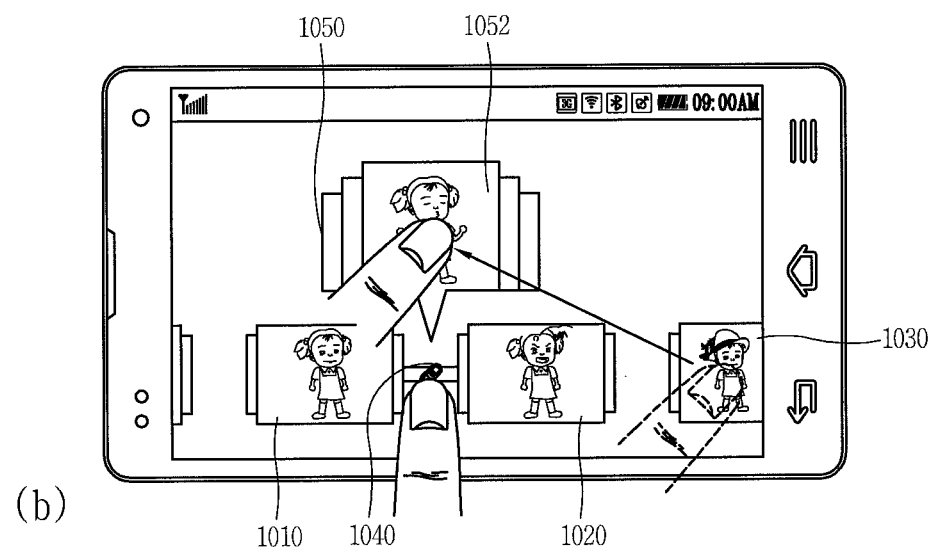

Referring to FIG. 10A(a), when the thumbnail 1030 of an image desired to be displayed in a successively linked manner is dragged to the second thumbnail 1020, the relevant image can be added to a second plurality of images. Accordingly, when the first or the second thumbnail 1010, 1020 is selected, the image of the dragged thumbnail 1030 can be added and displayed.

At this time, the play sequence of the added image can be set in various ways. For example, the added image may be immediately displayed prior to or subsequent to the image of the second thumbnail 1020.

Referring to FIG. 10A(b), when the link object 1040 is selected, the thumbnails 1050 of images captured subsequent to capturing the first image of the first thumbnail 1010 and images captured prior to capturing the second image of the second thumbnail 1020 can be unfolded and displayed.

Subsequently, when the user drags the thumbnail 1030 of the added image to the third thumbnail 1030 which is one of the unfolded thumbnails 1050, the added image subsequent to the third image corresponding to the third thumbnail 1052 can be reproduced. In other words, the sequence of reproducing the added image can be set.

Figure 10B:
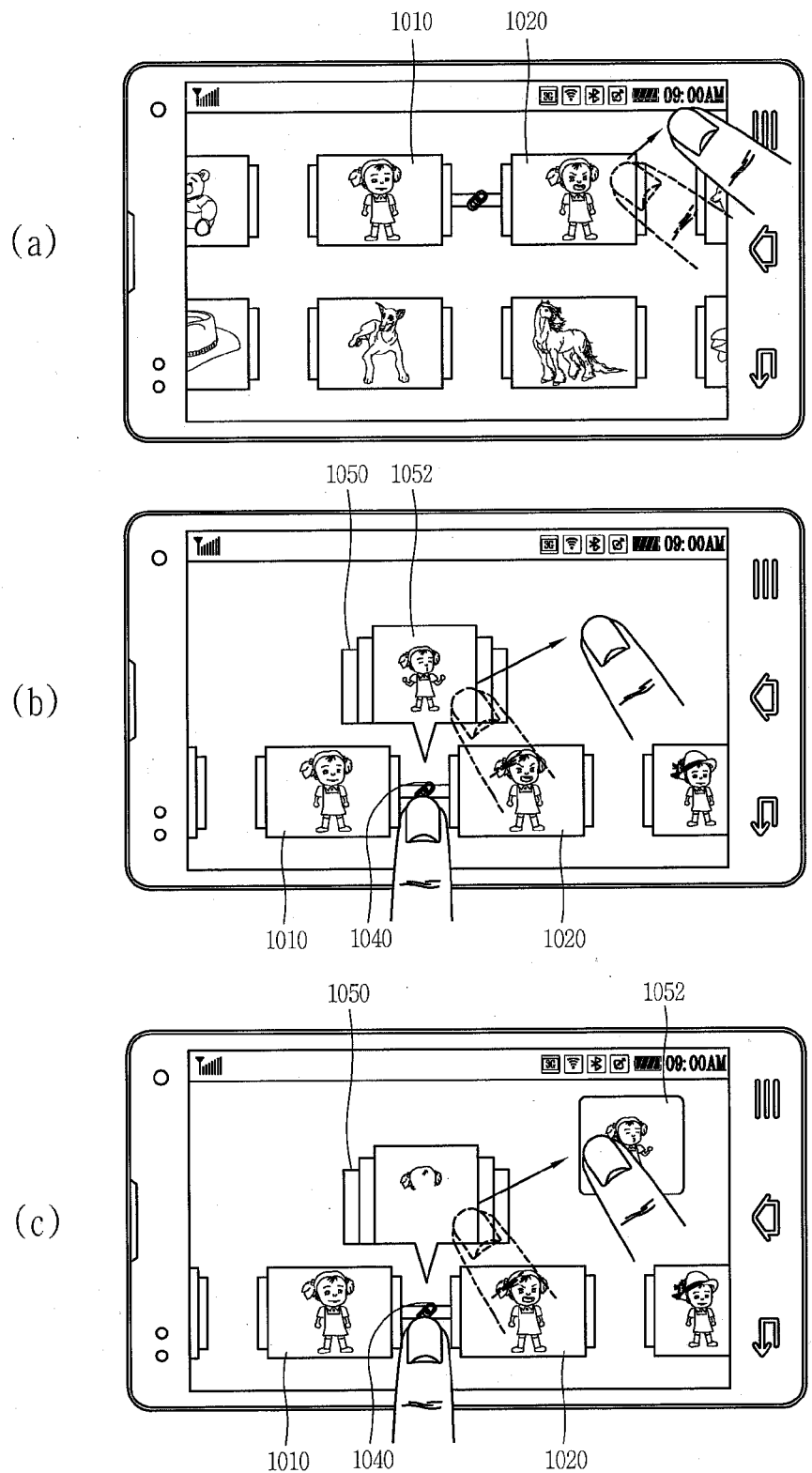

Referring to FIG. 10B(a), when the second thumbnail 1020 is dragged to a vacant space of the screen 151 or dragged in any direction, the second image can be deleted. As a result, only images excluding the second image may be successively displayed, and the thumbnail of an image captured subsequent to the second image can be displayed.

Referring to FIG. 10B(b), any one desired to be deleted from the thumbnails 1050 unfolded by touching the link object 1040 may be deleted by dragging it to a vacant space or in any direction. As a result, only images excluding the image of the selected thumbnail 1052 can be displayed in a successively linked manner.

Figure 11:
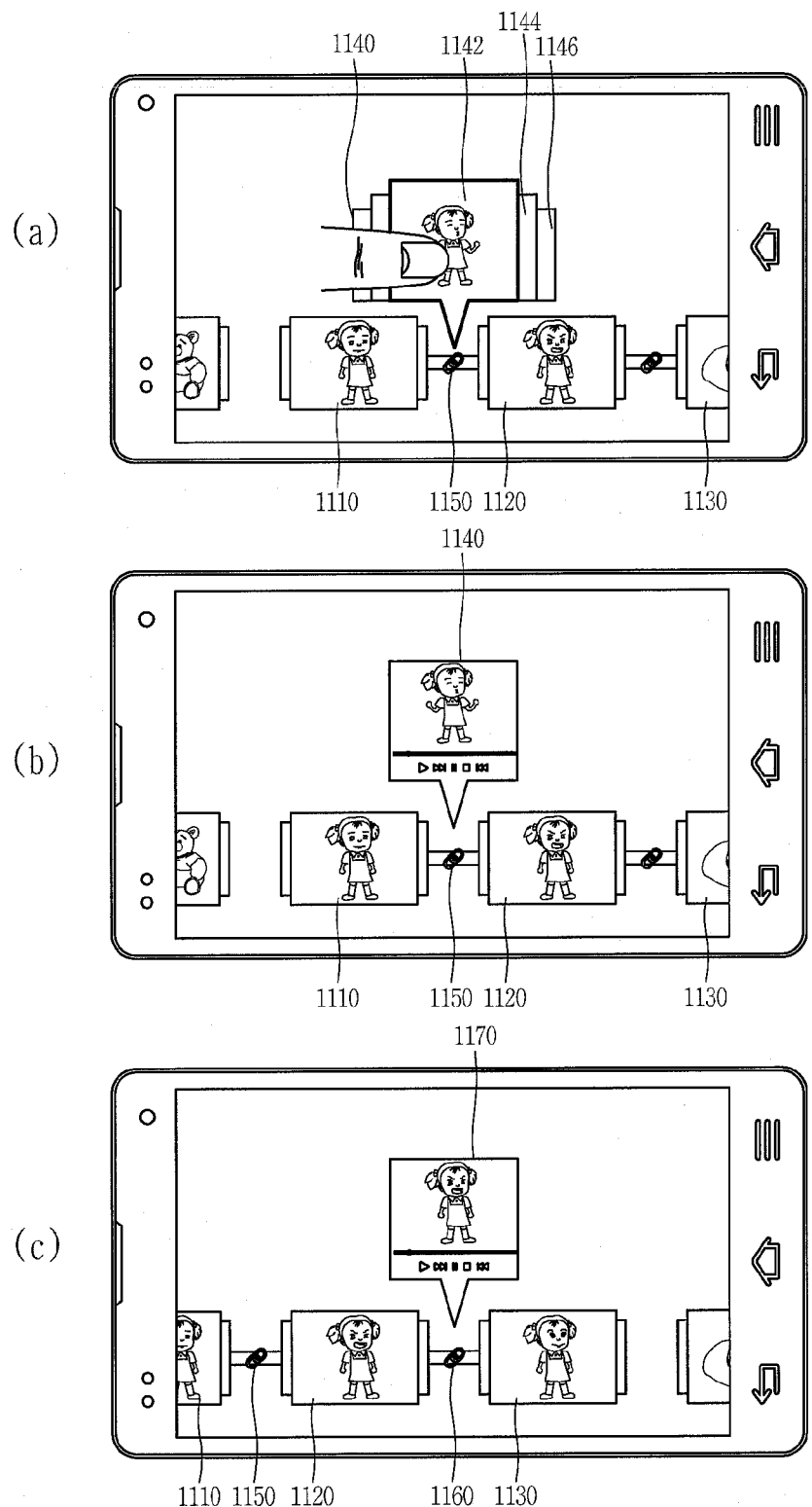
FIG. 11 is a conceptual view illustrating a user interface configured to reproduce a plurality of images in a successively linked manner according to another embodiment.

Referring to FIG. 10B(c), the thumbnail 1052 may be dragged to a vacant space to display only images corresponding to the thumbnail 1052 in a separate space. Even in this case, only images excluding the image of the selected thumbnail 1052 can be displayed in a successively linked manner. Furthermore, the dragged image 1052 is not deleted but separately exists as a sheet of image FIG. 11 is a conceptual view illustrating a user interface configured to reproduce a plurality of images in a successively linked manner according to another embodiment.

Referring to FIGS. 11A and 11B, if the user touches and selects one 1142 of thumbnails unfolded on a first link object 1150 connected between the first and the second thumbnail 1110, 1120, then images 1144, 1146 captured subsequent to the image of the selected thumbnail 1142 can be displayed in a successively linked manner at an inner portion 1140 of the thumbnail unfolded on the first link object 1150.

Referring to FIG. 11C, the images of thumbnails 1142, 1144, 1146 unfolded on the first link object 1150 may be all displayed, and then a plurality of automatically captured images may be displayed at an inner portion of the thumbnail 1170 displayed on the second link object 1160 connected between the second and the third thumbnail 1120, 1130.

Specifically, the second image of the second thumbnail 1120, images captured subsequent to capturing the second image and images captured prior to capturing the third image, the third image, images capturing subsequent to capturing the third image can be displayed in a successively linked manner at an inner portion of the thumbnail 1170 on the second link object 1160.

Figure 12A:
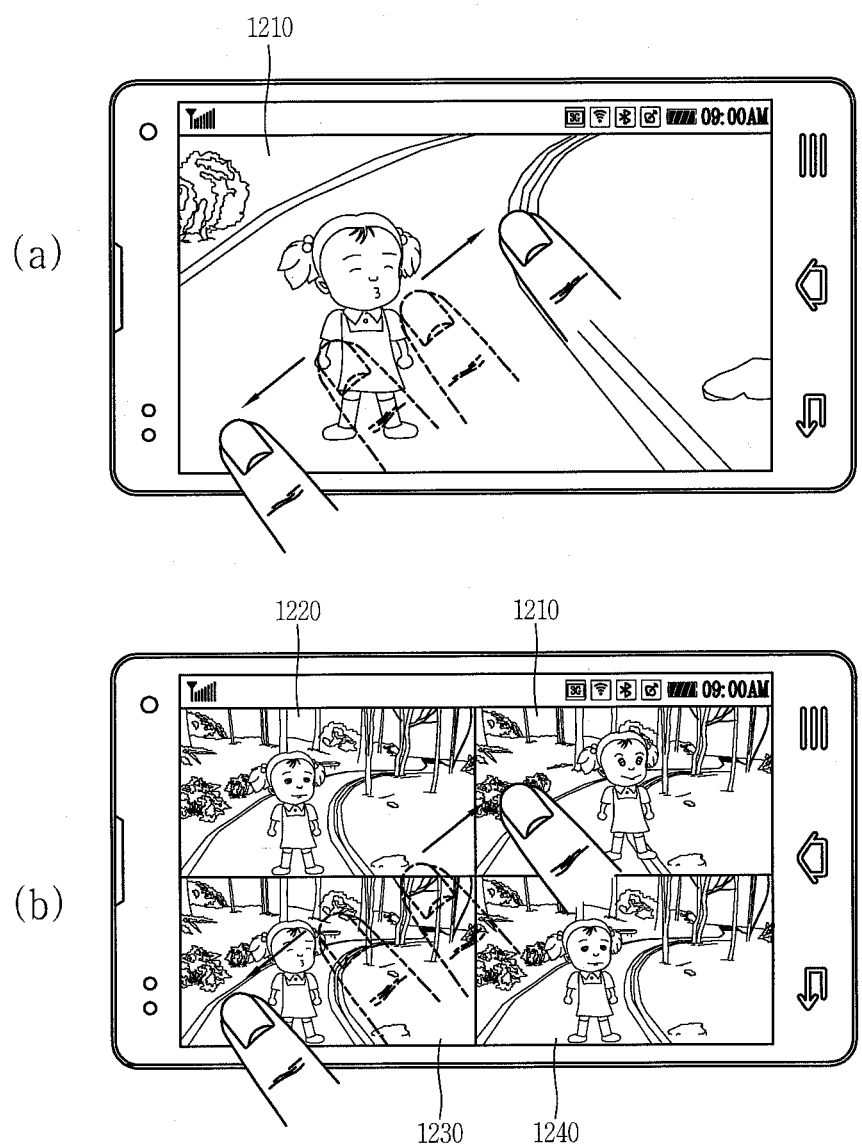
FIGS. 12A and 12B are conceptual views illustrating a user interface configured to display reproducible images at the same time according to an embodiment.
Figure 12B:
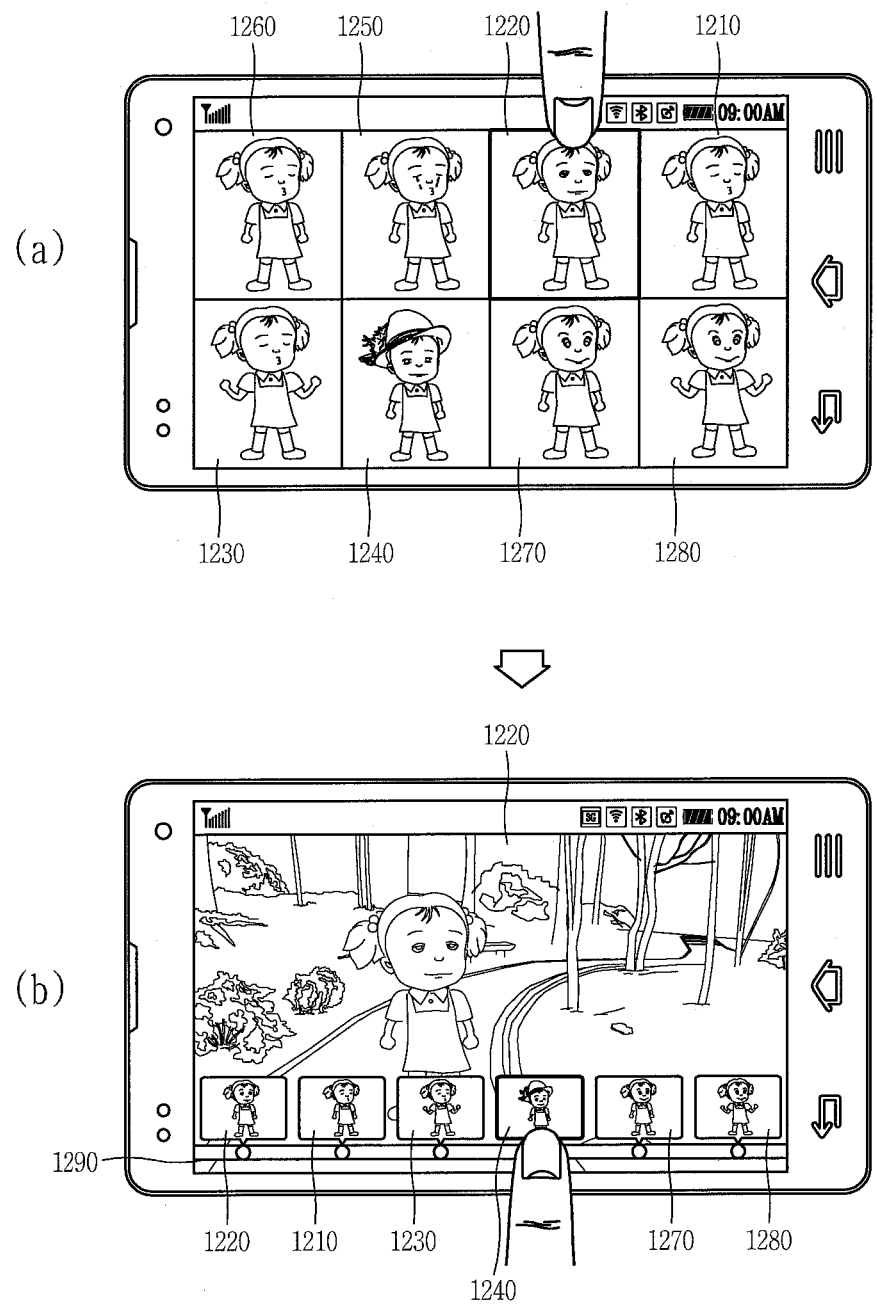

FIGS. 12A and 12B are conceptual views illustrating a user interface configured to display reproducible images at the same time according to an embodiment.

Referring to FIGS. 12A(a) and 12A(b), when the user applies a pinch-out input to the first image 1210, the first image 1210 and some 1220, 1230, 1240 of images captured at a point in time prior to and subsequent to capturing the first image can be unfolded.

Referring to FIG. 12B(a), when the user applies a pinch-out input again in FIG. 12A(b), some 1250, 1260, 1270, 1280 of images captured at a point in time prior to and subsequent to capturing the first image may be further displayed in addition to the images 1210, 1220, 1230, 1240 displayed in FIG. 12A(b).

For example, when the user applies a pinch-out input once, the first image 1210, the second image 1220 captured at 0.5 second prior to capturing the first image, the third image 1230 captured at 0.5 second subsequent to capturing the first image, and the image 1240 captured at 1 second subsequent to capturing the first image can be displayed.

Subsequently, when the user applies a pinch-out input again, images 1250, 1260 captured at 1 second and 1.5 seconds, respectively, prior to capturing the first image, and images 1270, 1280 captured at 1.5 seconds and 2 seconds, respectively, subsequent to capturing the first image can be displayed along with the previously displayed images 1210, 1220, 1230, 1240.

For another embodiment, automatically capture images may be displayed with a narrower time interval as a successive pinch-out input is applied.

Specifically, when an initial pinch-out input is applied to an image captured by pressing the capture button, four sheets of images captured with a four-second interval among images automatically captured for 16 seconds may be displayed.

Subsequently, when a pinch-out input is applied again to the displayed four sheets of images, eight sheets of images captured with a two-second interval may be displayed.

Referring to FIG. 12B(b), when the user selects one 1220 of the displayed images in FIG. 12B(a), images 1210, 1230, 1240, 1270, 1280 captured according to the time sequence from the relevant image 1220 can be displayed in a successively linked manner.

At this time, the thumbnails 1220, 1210, 1230, 1240, 1270, 1280 of displayable images may be displayed on the play bar 1290, and a dim image effect may be added to the thumbnail of a previously displayed image or the thumbnails of images captured prior to the selected image capture point in time. Otherwise, they may be displayed on the play bar 1290 from the thumbnail 1220 of the selected image.

For still another embodiment, when one 1240 of thumbnails displayed on the play bar 1290 is touched and selected while reproducing the image 1220, the screen may be converted to display images in a successively linked manner from an image corresponding to the relevant thumbnail 1240.

Figure 13A:
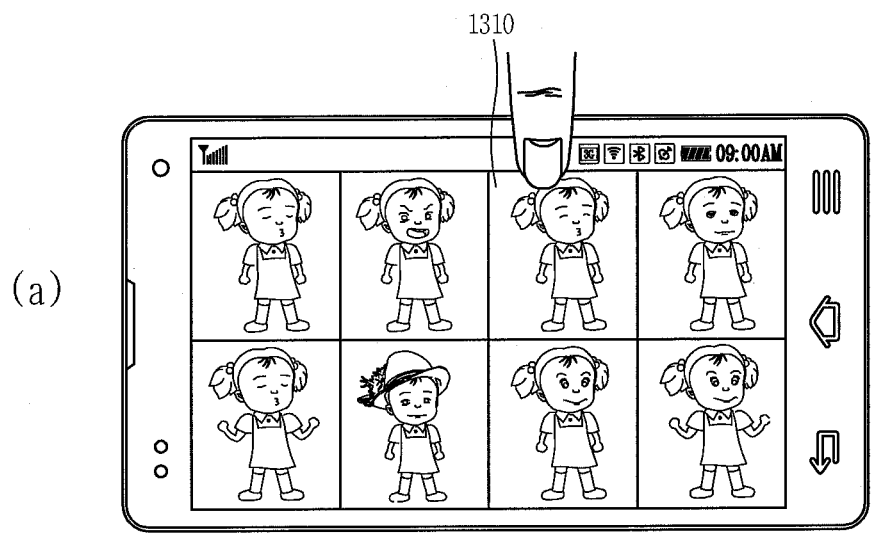
FIGS. 13A and 13B are conceptual views illustrating a user interface configured to reproduce an audio file contained in a plurality of images according to an embodiment.
Figure 13A:
Figure 13B:
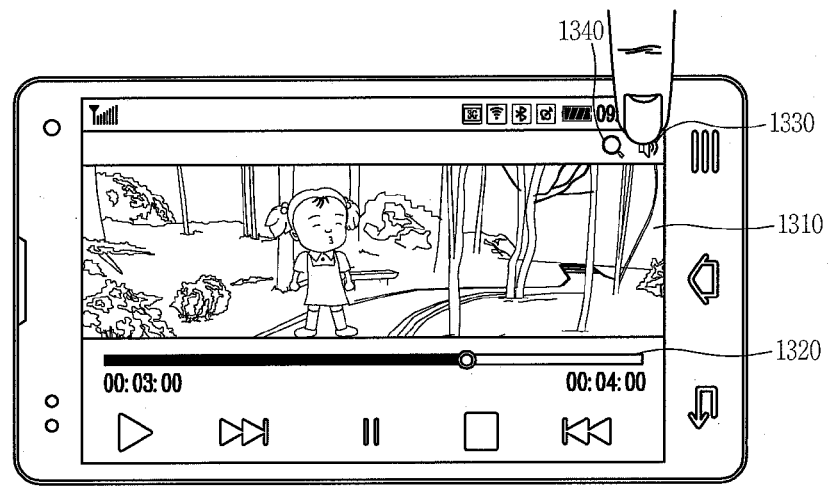
Figure 13B:
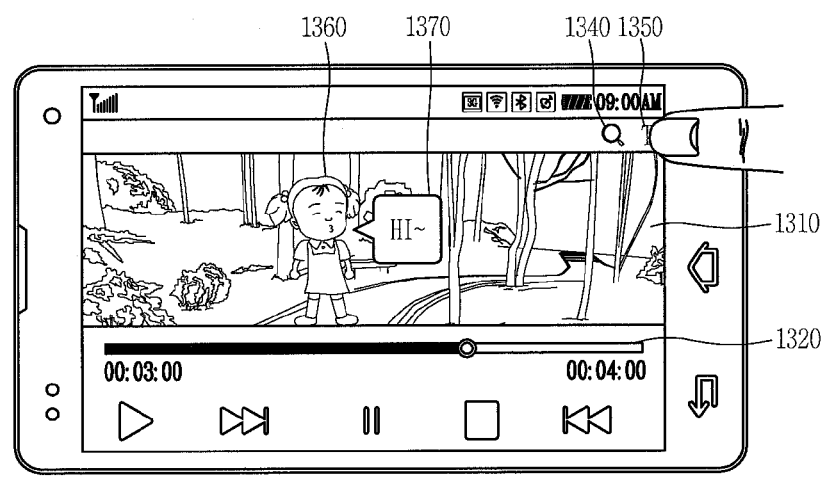

FIGS. 13A and 13B are conceptual views illustrating a user interface configured to reproduce an audio file contained in a plurality of images according to an embodiment.

Referring to FIG. 13A(a), a plurality of images can be unfolded and displayed as illustrated in FIGS. 12A and 12B. The user may touch and select one 1310 of them. For example, the thumbnail 1310 of the first image can be selected using a double tab.

Referring to FIG. 13A(b), the play bar 1320 of the first image 1310 may be displayed, and the user may control the location of the play bar 1320 using a drag input to display an image corresponding to the location of the play bar 1320.

Specifically, when a drag input is applied to the left side, images captured prior to capturing the first image 1310 can be displayed in a sequential manner. Similarly, when a drag input is applied to the right side, images captured subsequent to capturing the first image 1310 can be displayed in a sequential manner.

In other words, image files provided like one lengthy photo may be dragged in the horizontal direction to retrieve previous or subsequent images, and the thumbnail of images to be reproduced may be displayed on the play bar 1320 at a lower end thereof according to the play sequence of each image.

For yet still another embodiment, a flicking input may be applied to an image displayed in FIG. 13A(b) to retrieve images by turning them over.

Specifically, when a flicking input is applied to the left side, images captured prior to capturing the first image 1310 may be sequentially displayed. Similarly, when a flicking input is applied to the right side, images captured subsequent to capturing the first image 1310 may be sequentially displayed.

Referring to FIG. 13B(a), icons 1330, 1340 containing information on images captured along with the captured image may be displayed.

Specifically, when information on a captured place is stored, a location information icon 1340 may be displayed. Furthermore, when an audio file exists in the captured image, an audio information icon 1330 may be displayed.

For example, when information on a place where the first image 1310 is captured is stored, the location information icon 1340 can be displayed at the same time when displaying the first image 1310. When an audio file exists in an image displayed subsequent to the first image 1310, the location information icon 1340 that has been displayed disappears to display the audio information icon 1330.

For still yet another embodiment, the location and audio information icon 1340, 1330 continue to be displayed, and when an audio file exists in the displayed image, only the audio information icon 1330 may be displayed in a highlighted manner such as in an enlarged manner or in a different color.

Subsequently, when the user touches and selects the audio information icon 1330, only audio may be output while continuing to display the first image 1310. Specifically, the first image 1310 can be displayed on the screen 151, and only audio contained in images captured prior to and subsequent to the displayed image 1310 can be sent out.

For yet still another embodiment, while successively displaying images automatically captured subsequent to the first image 1310, audio contained in the images may be output at the same time. In other words, subsequent images may be displayed in a successively linked manner without using a drag input applied to the play bar 1320 or a flicking input applied to the images.

Referring to FIG. 13B(b), when an audio information icon is selected, audio is output, and the audio information icon 1330 may be changed to a text information icon 1350.

Specifically, when the user touches and selects the 1350, audio information may be converted and displayed as text. For example, text may be displayed at a lower end or edge of the screen 151. Otherwise, when the speaker of the voice is displayed on the image, the text may be displayed in a talk balloon for the relevant speaker.

For example, the voice of the speaker 1360 contained in the first image 1310 may be converted into text, and then the text may be displayed in a talk balloon 1370 for the speaker. At this time, the voice may be also sent out at the same time.

For still yet another embodiment, while successively displaying images automatically captured subsequent to the first image 1310, text converted from audio contained in the images may be output at the same time. In other words, subsequent images may be displayed in a successively linked manner without using a drag input applied to the play bar 1320 or a flicking input applied to the images.

Figure 14:
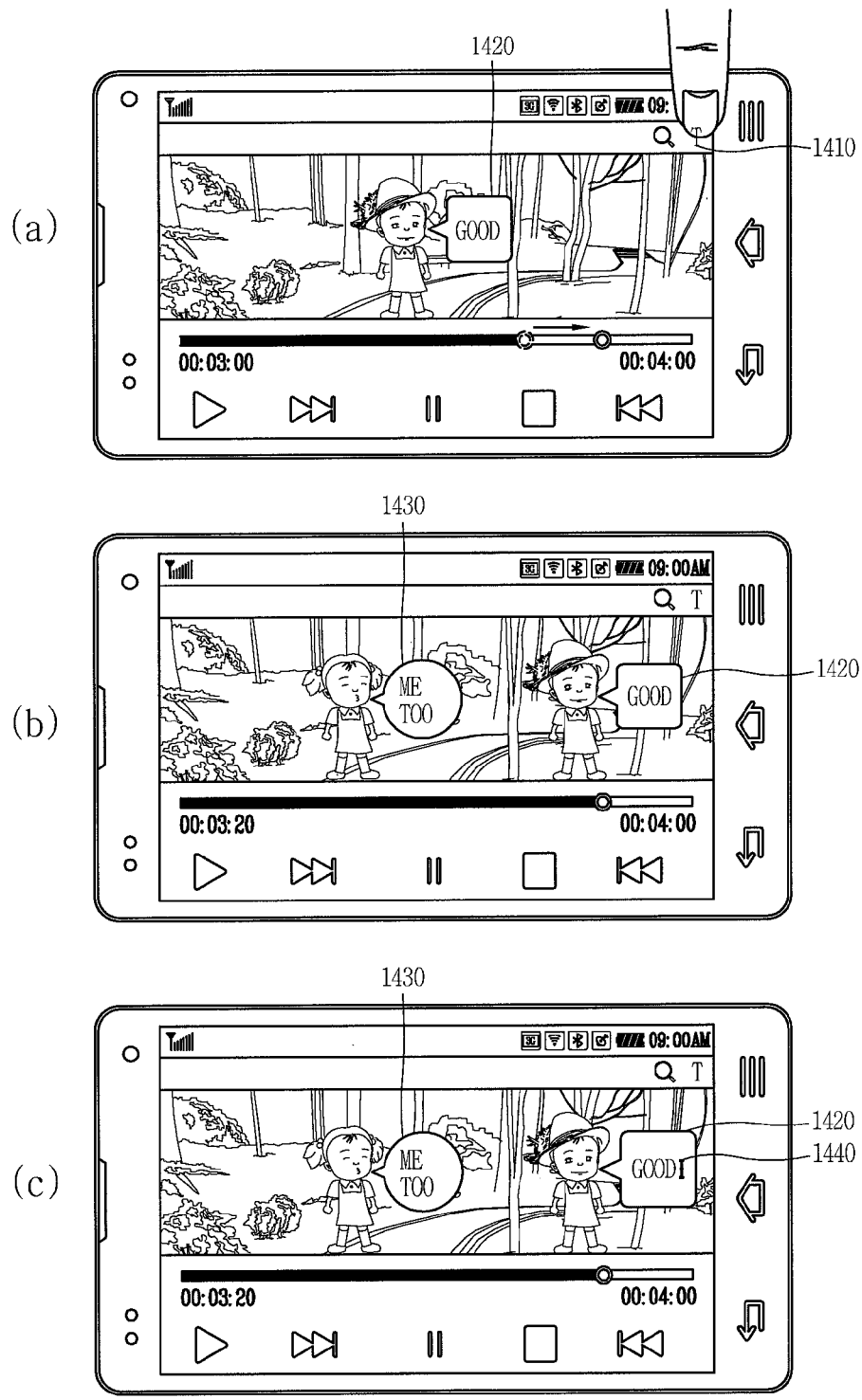
FIG. 14 is a conceptual view illustrating a user interface configured to edit text converted from a voice contained in an image according to an embodiment.

FIG. 14 is a conceptual view illustrating a user interface configured to edit text converted from a voice contained in an image according to an embodiment.

Referring to FIG. 14A, when the user touches a text information icon 1410, text 1420 converted from audio being output from an image may be output at the same time while turning the screen over. At this time, the audio of the relevant text can be output at the same time.

Referring to FIG. 14B, talk balloons 1420, 1430 containing texts that are spoken by speakers may be displayed for each speaker, and each talk balloon 1420, 1430 may be displayed in a different color or shape. Subsequently, the user may touch and select the talk balloon 1420 of the text desired to be edited.

Referring to FIG. 14C, it enters a text edit mode capable of editing the selected text. Specifically, the selected talk balloon 1420 may be displayed in an enlarged manner, and a cursor 1440 capable of modifying text may be displayed within the talk balloon 1420.

Accordingly, the user can modify text, and then audio corresponding to the modified text can be output when an audio information icon is selected by the user. In other words, the user can also modify audio information being output due to the modification of text. Furthermore, the user can delete the displayed text to delete the audio.

As illustrated in FIGS. 13 and 14, when selecting the audio information icon 1330, the audio information icon 1330 may be changed and displayed as a text information icon 1350 or 1410, but each icon 1330, 1350 or 1410 may be displayed in a separate manner. In other words, the audio and text information icon 1330, 1350 or 1410 may be displayed at once, respectively.

Figure 15:
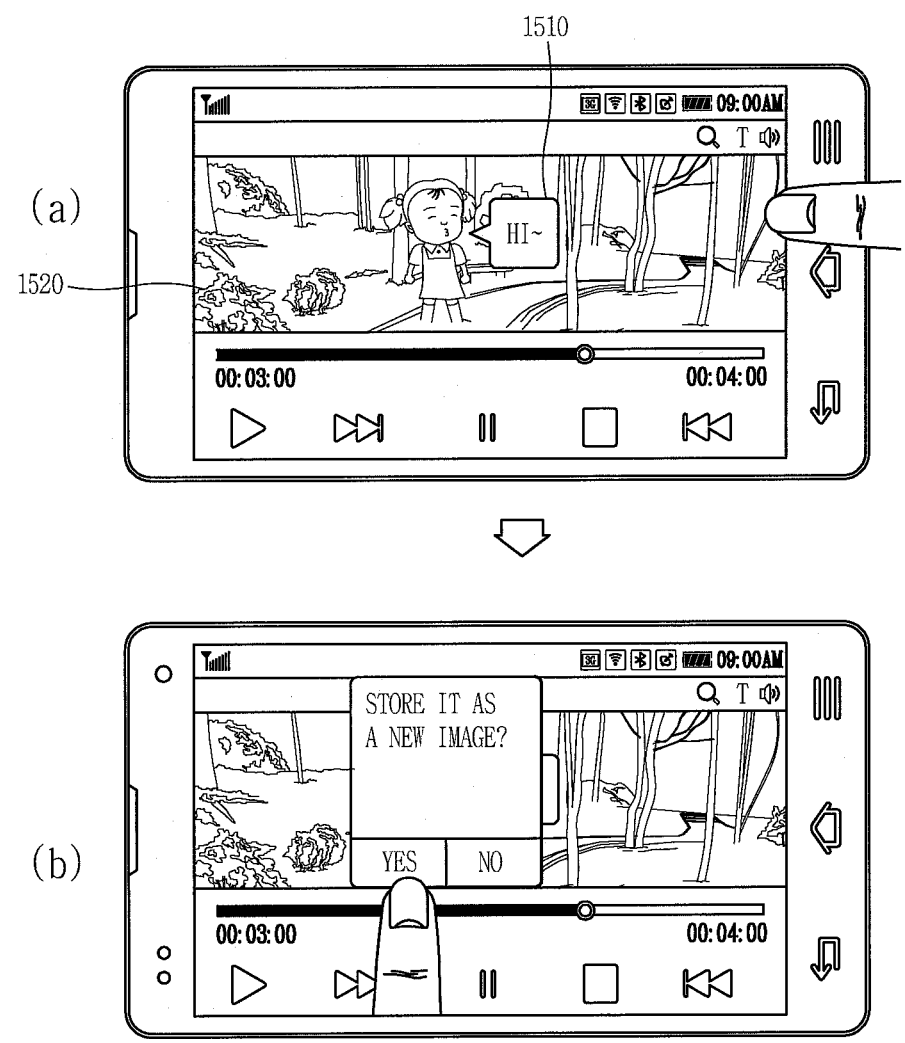
FIG. 15 is a conceptual view illustrating a user interface configured to store an image displayed with text according to an embodiment.

FIG. 15 is a conceptual view illustrating a user interface configured to store an image displayed with text according to an embodiment.

Referring to FIG. 15A, text converted from the voice may be displayed at the same time on the image 1520. At this time, the user can apply a long touch or double tap to select the displayed image 1520.

Referring to FIG. 15B, a message window 1530 asking whether to store the displayed image 1520 may be displayed. When the user touches and selects a "Yes" button, the image 1520 displaying the text 1510 may be stored.

Specifically, the image 1520 displaying the text 1510 may be stored instead of a previous image that has not been displayed with the text 1510. Otherwise, the image 1520 displaying the text 1510 may be stored as one of images prior to and subsequent to a previous image.

For yet still another embodiment, the audio file of the relevant text may be also stored along with the image 1520 displaying the text 1510.

For still yet another embodiment, when the user applies a double tab to the edited screen after text editing in FIG. 14, a message window 1530 asking whether to store the image may be displayed similarly to that of FIG. 15B.

Figure 16:
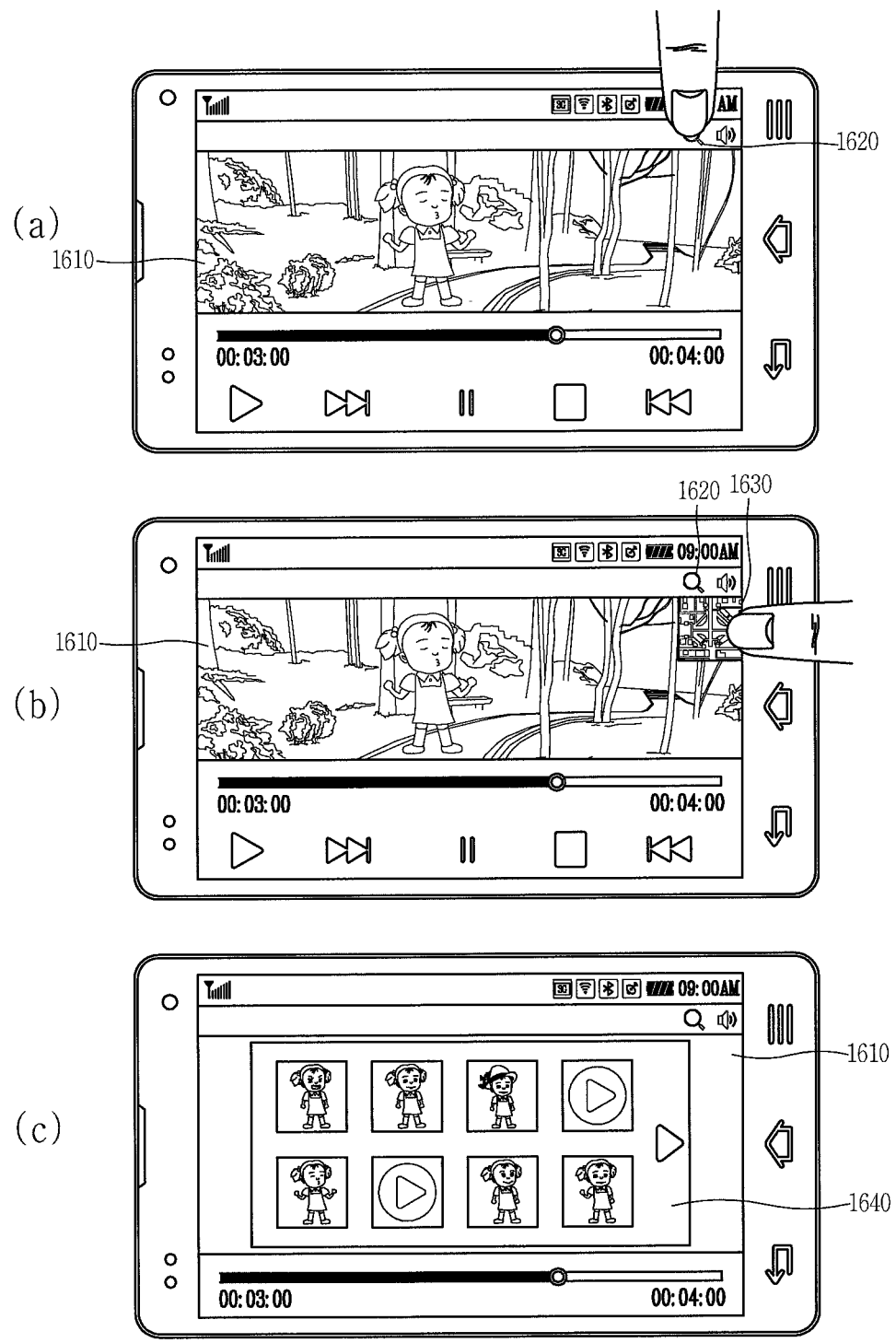
FIG. 16 is a conceptual view illustrating a user interface associated with the location information of an image according to an embodiment.

FIG. 16 is a conceptual view illustrating a user interface associated with the location information of an image according to an embodiment.

Referring to FIGS. 16A and 16B, when the user touches a location information icon 1620, information 1630 on a location at which the displayed image 1610 is captured may be displayed on the screen.

For example, a map 1630 indicating a location at which the first image 1610 is captured, a name 1630 of a place at which the first image 1610 is captured or the like may be displayed. Subsequently, the user can touch and select the displayed information 1630.

Referring to FIG. 16C, the thumbnails 1640 of an image or video associated with the selected location information 1630 may be displayed. For example, images captured at the same place as that of the first image 1610 or the thumbnail of images captured at a place associated with a place where the first image 1610 is captured may be displayed. Furthermore, a plurality of thumbnail lists may be turned over and displayed according to the user's flicking input.

At this time, when the user touches and selects one of the plurality of thumbnails, the image of the relevant thumbnail may be displayed.

Figure 17A:
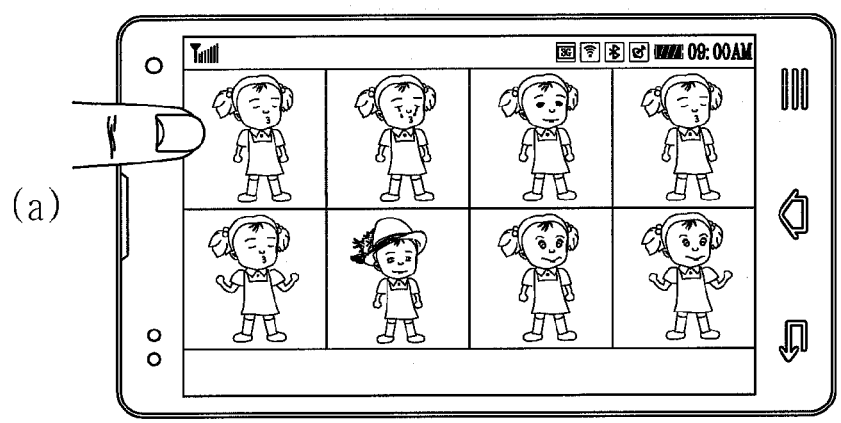
FIGS. 17A and 17B are conceptual views illustrating a user interface configured to select images to be reproduced according to an embodiment.
Figure 17A:
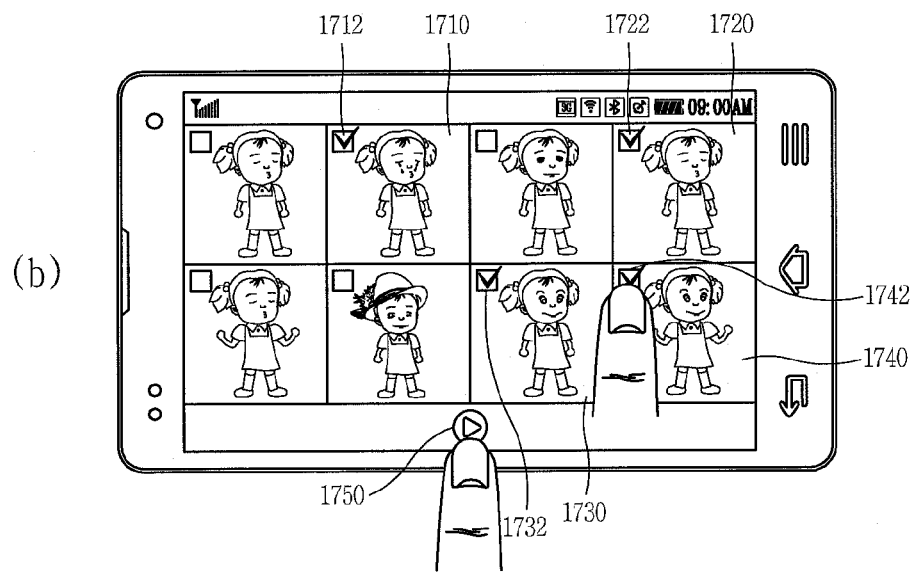
Figure 17B:
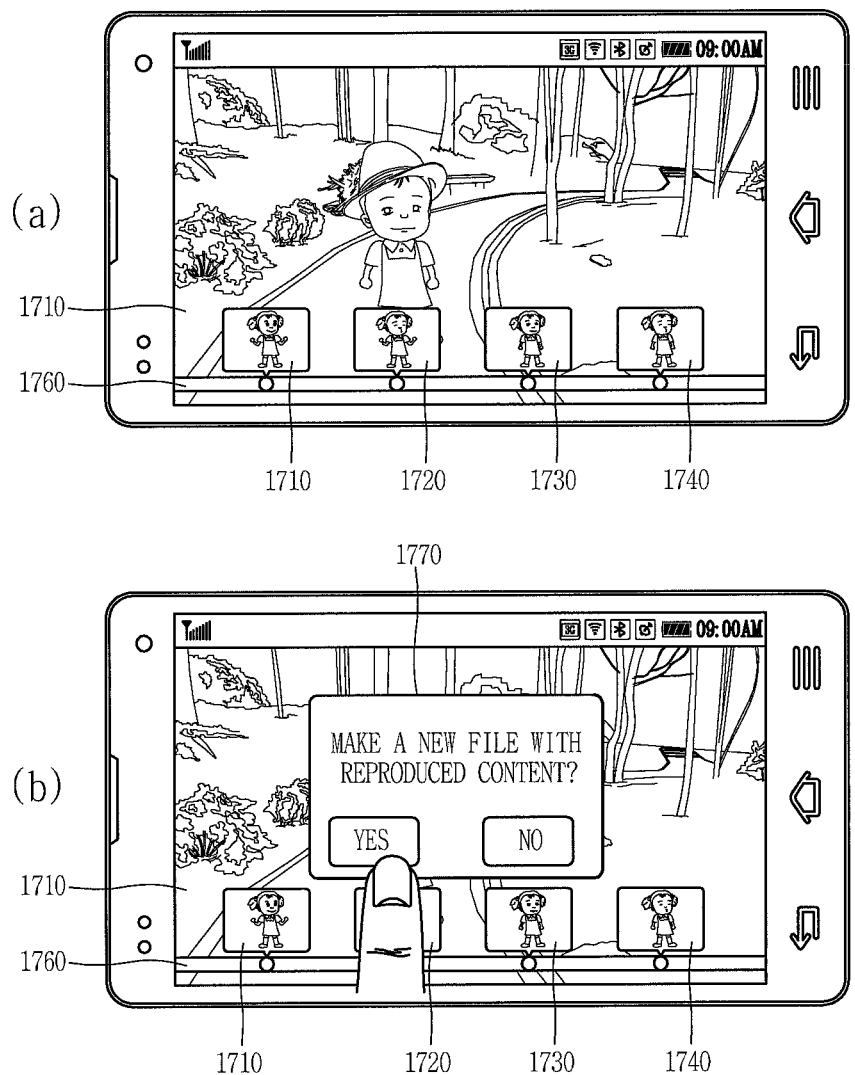

FIGS. 17A and 17B are conceptual views illustrating a user interface configured to select images to be reproduced according to an embodiment.

Referring to FIGS. 17A(a) and 17A(b), when the user applies a long touch to the screen displayed with the thumbnails of images, a check box is displayed for each image. When the user touches and selects check boxes 1712, 1722, 1732, 1742, check indicators are displayed in the check boxes 1712, 1722, 1732, 1742, respectively. Then, the user can touch and select a play button 1750.

Referring to FIG. 17B(a), only images 1710, 1720, 1730, 1740 checked with a check box may be displayed in a successively linked manner, and thumbnails 1710, 1720, 1730, 1740 corresponding to the checked images may be displayed on a play bar 1760.

As an embodiment, thumbnails corresponding to unchecked images may be displayed on the play bar along with a dim effect.

Referring to FIG. 17B(b), the checked images 1710, 1720, 1730, 1740 are all reproduced, and then a message window 1770 asking whether or not to make a new file with the reproduced images 1710, 1720, 1730, 1740 may be displayed. Subsequently, the user may select "Yes" to store the reproduced images 1710, 1720, 1730, 1740 as a new file.

Figure 18A:
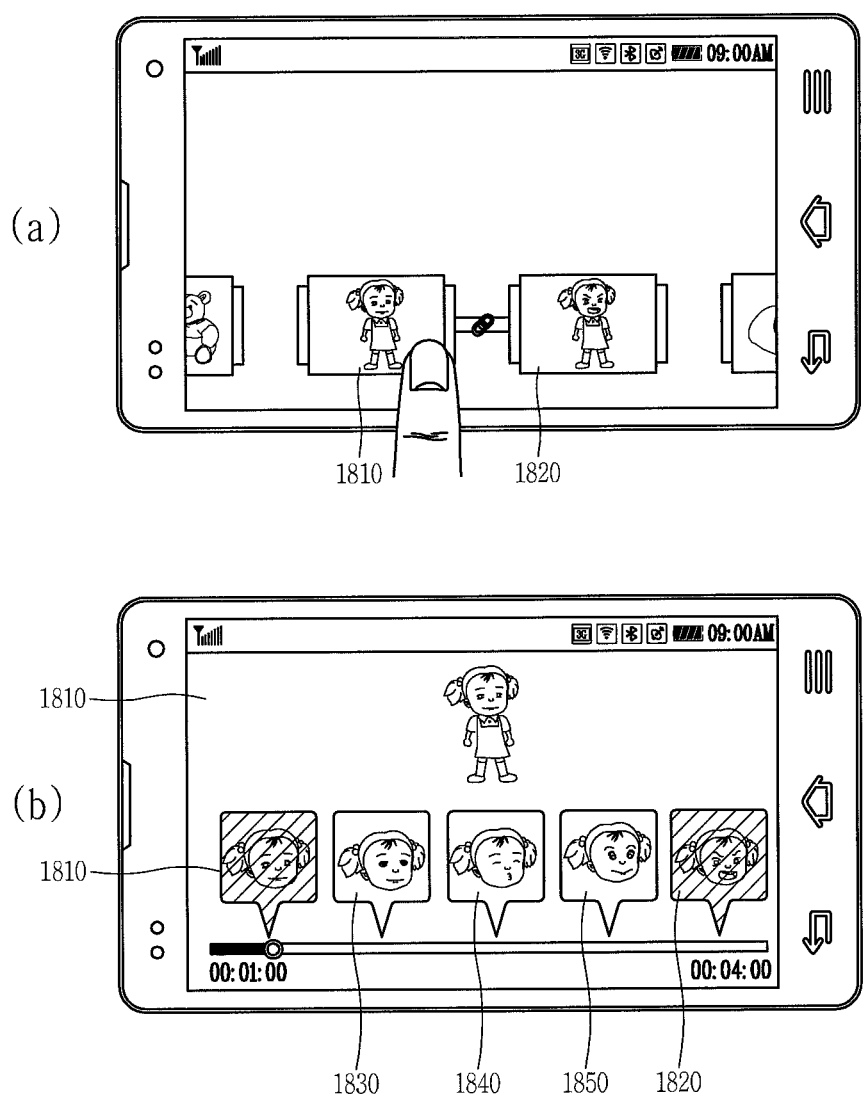
FIGS. 18A and 18B are conceptual views illustrating a user interface configured to display a captured image as a thumbnail according to an embodiment.
Figure 18B:
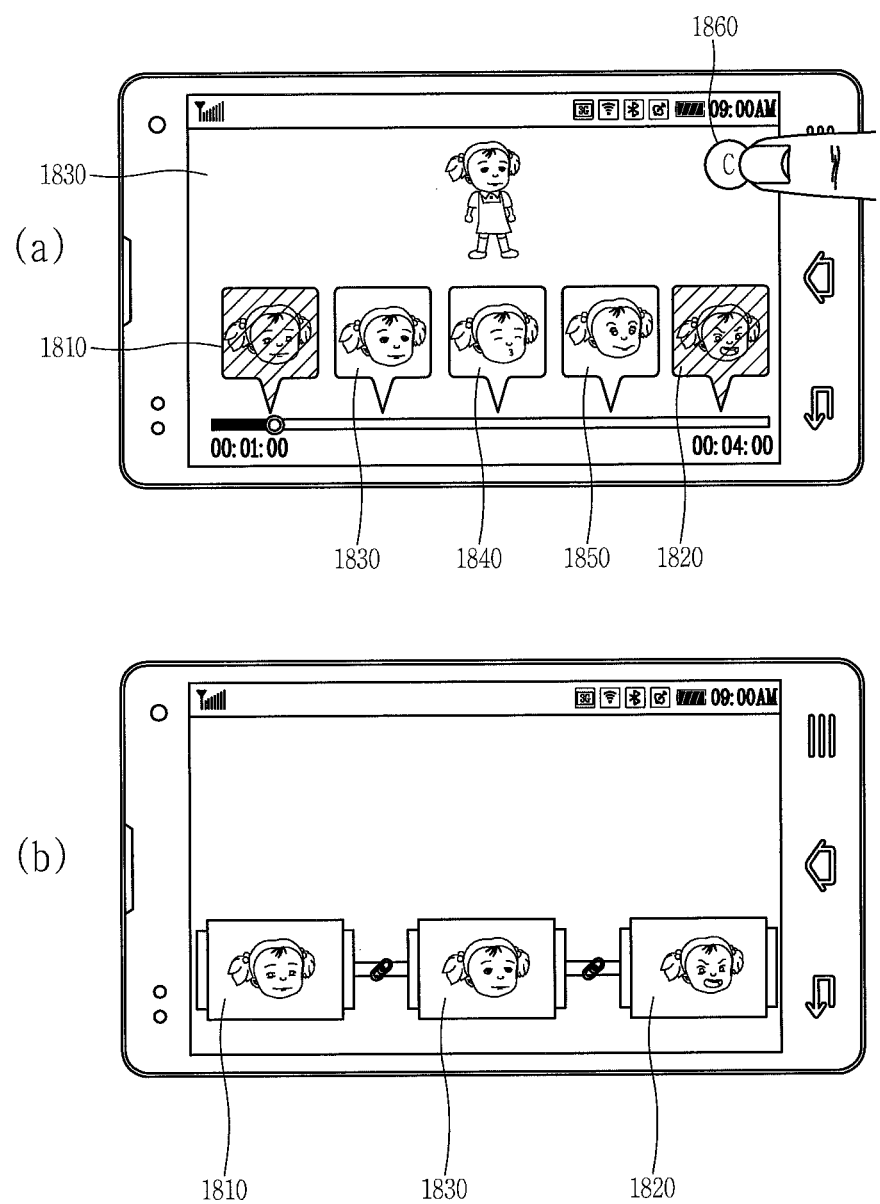

FIGS. 18A and 18B are conceptual views illustrating a user interface configured to display a captured image as a thumbnail according to an embodiment.

Referring to FIGS. 18A(a) and 18A(b), when the user touches and selects the thumbnail of the first image 1810, the first image 1810 and images 1830, 1840, 1850, 1820 captured subsequent to capturing the first image 1810 may be successively displayed like video.

Specifically, images 1830, 1840, 1850 automatically captured subsequent to capturing the first image 1810 by pressing the capture button and a second image 1820 captured by pressing the capture button may be successively displayed.

As described above, the thumbnail of each image 1810, 1830, 1840, 1850, 1820 may be displayed on a play bar. Furthermore, an image effect distinguished from that of the thumbnail of automatically captured images 1830, 1840, 1850 may be added to the thumbnail of the first and the second image 1810, 1820 captured by pressing the capture button.

Referring to FIG. 18B(a), one 1830 of automatically captured images being reproduced may be captured by selecting the capture button 1860.

Specifically, the capture button 1860 may be implemented with a touch button capable of receiving a touch input or a physical button capable of receiving a push input.

Referring to FIG. 18B(b), the thumbnail of the captured image 1830 may be connected and displayed between the thumbnails of the first and the second image 1810, 1820 with a link object.

In other words, when compared with FIG. 18A(a), it is seen that the thumbnail of the captured image 1830 may be connected and displayed between the thumbnails of the first and the second image 1810, 1820 with a link object.

According to the present disclosure, the user can capture an image even for a predetermined period of time prior to and subsequent to directly touching the capture button of the terminal camera. As a result, the user can capture his or her desired scene without missing.

Furthermore, images associated with one another, for example, images that have captured for the same object or images captured within a predetermined period of time, may be collectively displayed at once or successively displayed like video.

In addition, images to be displayed in a successively linked manner may be edited using a method of selecting images to be successively displayed, removing part of images being successively displayed, or the like.

As a result, it may be possible to enhance the user's convenience.

According to an embodiment of present disclosure, the foregoing method may be implemented as codes readable by a processor on a medium written by a program. Examples of the processor-readable media may include ROM, RAM, CD-ROM, magnetic tape, floppy disk, and optical data storage device, and the like, and also include a device implemented in the form of a carrier wave (for example, transmission via the Internet).

The configurations and methods according to the above-described embodiments will not be applicable in a limited way to the foregoing mobile terminal, and all or part of each embodiment may be selectively combined and configured to make various modifications thereto.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
   an image generation unit configured to capture an image;
   a display unit configured to display the captured image; and
   a controller configured to:
   capture a first image when a capturing command is received at a first time point, wherein the first image is linked with a first moving image that is captured for a predetermined period of time prior and subsequent to the first time point;
   capture a second image when a capturing command is received at a second time point subsequent to the first time point, wherein the second image is linked with a second moving image that is captured for a predetermined period of time prior and subsequent to the second time point;
   determine whether or not the first image and the second image are satisfied with a preset specific condition;
   link the first image and the first moving image with the second image and the second moving image; and output the first image, the first moving image, the second image and the second moving image according to the captured time sequence when a play command for the first image is received.

2. The mobile terminal of claim 1, wherein the preset specific condition includes at least one of:
a situation in which the first time point and the second time point are within a previously set time period,
a situation in which the first image and the second image are captured within a previously set distance, and
a situation in which the first image and the second image contain a same object.

3. The mobile terminal of claim 1, wherein the controller is configured to display the first image and the second image to be adjacent to each other, and to display a link object to connect the second image that is adjacent to the first image.

4. The mobile terminal of claim 3, wherein in response to selection of the link object, the controller is configured to display the first moving image and the second moving image.

5. The mobile terminal of claim 4, wherein the controller is configured to display an image selected from the first image and the second image and to display at least a portion of the first and the second moving image subsequent to the selected image according to the captured time sequence.

6. The mobile terminal of claim 1, wherein the controller is configured to display the first image, the second image and the first moving image and the second moving image to be adjacent to one another.

7. The mobile terminal of claim 6, wherein the controller is configured to select and delete the first moving image and the second moving image from among the displayed adjacent images.

8. The mobile terminal of claim 6, wherein the controller is configured to add at least one new image to the displayed adjacent images.

9. The mobile terminal of claim 6, wherein the controller is configured to display an image selected from the displayed adjacent images, and to display at least a portion of the first and the second moving image subsequent to the selected image.

10. A control method of a mobile terminal, the method comprising:
capturing a moving image;
capturing a first image when an capturing command is received at a first time point, wherein the first image is linked with a first moving image that is captured for a predetermined period of time prior and subsequent to the first time point;
capturing a second image when an capturing command is received at a second time point subsequent to the first time point, wherein the second image is linked with a second moving image that is captured for a predetermined period of time prior and subsequent to the second time point;
determining whether or not the first image and the second image are satisfied with a preset specific condition;
linking the first image with the second image; and
outputting the first image, the first moving image, the second image and the second moving image according to the captured time sequence when a play command for the first image is received.

11. The method of claim 10, wherein the preset specific condition includes at least one of:
a situation in which the first time point and the second time point are within a previously set time period,
a situation in which the first image and the second image are captured within a previously set distance, and
a situation in which the first image and the second image contain a same object.

12. The method of claim 10, further comprising:
displaying the first image and the second image to be adjacent to each other, and
displaying a link object to connect the second image that is adjacent the first image.

13. The method of claim 12, further comprising:
receiving a selection of the link object; and
displaying the first moving image and the second moving image to be adjacent to the link object.

14. The method of claim 13, wherein displaying the first image and the second image includes displaying an image selected from the first image and the second image and displaying at least a portion of the first and the second moving image subsequent to the selected image according to the captured time sequence.

15. The method of claim 10, further comprising:
displaying the first image, the second image and the first moving image and the second moving image to be adjacent to one another.

16. The method of claim 15, wherein displaying the first image and the second image includes selecting and deleting at least one image from among the displayed adjacent images or adding at least one new image to the displayed adjacent images.

17. The method of claim 15, wherein displaying the first image and the second image includes displaying an image selected from the displayed adjacent images and displaying at least a portion of the first and the second moving image subsequent to the selected image.

18. A mobile terminal, comprising:
a camera to capture an image;
a display; and
a controller that is configured to:
capture a moving image via the camera;
capture a first image when at a first time point in which an image control capturing command is received at a first time point via the camera;
capture a second image when a capturing command is received at a second time point subsequent to the first time point via the camera;
determine whether or not the first image and the second image are satisfied with a preset specific condition;
link the first image and a first moving image with the second image and a second moving image, wherein the first moving image is captured for a predetermined period of time prior and subsequent to the first time point, and the second moving image is captured for a predetermined period of time prior and subsequent to the second time point; and
output the first image, the first moving image, the second image and the second moving image according to the captured time sequence when a play command for the first image is received.

19. The mobile terminal of claim 18, wherein the controller is configured to control the display to display a link object to connect the second image that is displayed to be adjacent the first image.

20. The mobile terminal of claim 19, wherein in response to selection of the link object, the controller is configured to control the display to display at least one image automatically captured between the first time point and the second time point.

21. The mobile terminal of claim 20, wherein the controller is configured to control the display to display an image selected from the first image and the second image and at least one image captured subsequent to the selected image in a successively linked manner according to the captured time sequence.

22. The mobile terminal of claim 18, wherein the controller is configured to control the display to display the first image and the second image to be adjacent to one another.

23. The mobile terminal of claim 22, wherein the controller is configured to select and delete at least one image from among the displayed adjacent images or the controller is controlled to add at least one new image to the displayed adjacent images.

* * * * *